(12) United States Patent
Ruhm

(10) Patent No.: US 11,577,928 B2
(45) Date of Patent: Feb. 14, 2023

(54) SHEET PROCESSING MACHINE COMPRISING AT LEAST ONE PILE FORMATION DEVICE, AND METHOD FOR FORMING PILES

(71) Applicant: KOENIG & BAUER AG, Würzburg (DE)

(72) Inventor: Sylvio Ruhm, Dresden (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/642,246

(22) PCT Filed: Oct. 15, 2020

(86) PCT No.: PCT/EP2020/079034
§ 371 (c)(1),
(2) Date: Mar. 11, 2022

(87) PCT Pub. No.: WO2021/083676
PCT Pub. Date: May 6, 2021

(65) Prior Publication Data
US 2022/0267114 A1 Aug. 25, 2022

(30) Foreign Application Priority Data
Oct. 28, 2019 (DE) .......................... 102019128978.5

(51) Int. Cl.
*B65H 31/10* (2006.01)
*B65H 43/06* (2006.01)

(52) U.S. Cl.
CPC ............. *B65H 31/10* (2013.01); *B65H 43/06* (2013.01); *B65H 2301/42172* (2013.01)

(58) Field of Classification Search
CPC ...................... B65H 2301/42172; B65H 31/10
See application file for complete search history.

(56) References Cited

U.S. PATENT DOCUMENTS

| | | | | |
|---|---|---|---|---|
| 11,247,338 | B2* | 2/2022 | Kato | B25J 15/0019 |
| 2022/0315371 | A1* | 10/2022 | Ollé | B65H 29/044 |
| 2022/0356029 | A1* | 11/2022 | Ruhm | B65H 33/04 |

FOREIGN PATENT DOCUMENTS

| | | |
|---|---|---|
| CN | 101112952 A | 1/2008 |
| CN | 103253536 A | 8/2013 |

(Continued)

OTHER PUBLICATIONS

International Search Report of PCT/EP2020/079034 dated Feb. 9, 2021.

(Continued)

*Primary Examiner* — Howard J Sanders
(74) *Attorney, Agent, or Firm* — Mattingly & Malur, PC

(57) ABSTRACT

In some examples, a sheet processing machine includes an at least one pile formation device. The at least one pile formation device is arranged so as to be displaceable at least in an inward-moving direction. The at least one pile formation device includes a plane. The at least one pile formation device is displaceable at least in a vertical direction relative to at least one lower multiple-up separating tool by means of a lifting device. In a temporary storage position, at least the plane is arranged in a vertical direction beneath a plane of the at least one lower multiple-up separating tool.

15 Claims, 11 Drawing Sheets

(56) References Cited

FOREIGN PATENT DOCUMENTS

| | | |
|---|---|---|
| DE | 2630094 A1 | 1/1978 |
| DE | 3623077 A1 | 2/1988 |
| DE | 19516023 A1 | 11/1996 |
| DE | 19516023 B4 | 3/2004 |
| DE | 102015218145 A1 | 3/2017 |
| EP | 2 399 715 A1 | 12/2011 |
| EP | 2452790 A1 | 5/2012 |
| EP | 2840047 A1 | 2/2015 |
| ES | 2064222 A2 | 1/1995 |
| JP | 6164662 A | 4/1986 |
| JP | 0565951 U | 8/1993 |

OTHER PUBLICATIONS

Chinese Office Action received in corresponding Chinese Application No. 202080063612.9 dated Jul. 26, 2022.

\* cited by examiner

SHEET PROCESSING MACHINE COMPRISING AT LEAST ONE PILE FORMATION DEVICE, AND METHOD FOR FORMING PILES

CROSS-REFERENCES TO RELATED APPLICATIONS

This application is the US national phase, under 35 USC § 371, of PCT/EP2020/079034, filed Oct. 15, 2020; published as WO 2021/083676 A1 on May 6, 2021, and claiming priority to DE 10 2019 128 978.5, filed Oct. 28, 2019, the disclosures of which are expressly incorporated by reference herein in their entireties.

TECHNICAL FIELD

The invention relates to a sheet processing machine comprising at least one pile formation device and to a method for forming piles. A sheet processing machine comprises an at least one pile formation device and at least one lower multiple-up separating tool. The at least one pile formation device is arranged so as to be displaceable at least in an inward-moving direction. The at least one pile formation device includes a plane, and the at least one pile formation device is arranged so as to be displaceable at least in a vertical direction relative to the at least one lower multiple-up separating tool by means of a lifting device. In a temporary storage position, at least the plane is arranged in a vertical direction beneath a plane of the lower multiple-up separating tool. Additionally, examples herein relate to a method for forming piles in a sheet processing machine comprising at least one pile formation device and comprising at least one lower multiple-up separating tool. The method includes steps of inwardly moving the at least one pile formation device in an inwardly-moving direction from an inward-moving position into a temporary storage position, and outwardly moving the at least one pile formation device from a temporary storage position into an outwardly-moving position that is counter to the inwardly-moving direction. The at least one pile formation device includes a plane and, at least in the temporary storage position, is arranged in the vertical direction beneath a plane of a lower multiple-up separating tool.

BACKGROUND

Web- or sheet-like materials are used in the production of packaging. For example, sheets are imprinted, embossed, creased, perforated, die-cut, cut, stitched, glued and, for example, folded into packaging in multiple processing steps. To optimally utilize the surface area of a sheet, in general multiple identical or different copies, for example of a poster, a folding box or a packaging, are printed on a common sheet and then die-cut. These copies are referred to as multiple-up copies.

A sheet processing machine can comprise different processing steps, such as imprinting, cutting, embossing, creasing, die cutting, perforating, gluing and/or stitching. Such sheet processing machines frequently also comprise inspection devices. Sheets are typically processed and cut to size in processing machines using tool-dependent die cutting and cutting devices.

Such a processing machine is configured as a die cutting, cutting, perforating, embossing and/or creasing machine, for example. When such a processing machine is referred to hereafter as a die cutter and/or a die-cutting machine, in particular also a cutting, perforating, embossing and/or creasing machine is meant. In addition to rotary die cutters, tool-dependent systems also encompass flat die cutters, in particular flat-bed die cutters. In these, multiple sheets are processed consecutively by a cyclically recurring movement.

The sheets are preferably moved substantially horizontally through the processing machine by way of a transport system, preferably a chain gripper system. In addition to a die-cutting unit, such a machine usually also comprises other units, such as a sheet infeed unit, a sheet delivery unit, a stripping unit, a sheet insert unit, a multiple-up separating unit, and an offcut piece delivery unit.

In the multiple-up separating unit, the multiple-ups are separated by means of an upper and a lower multiple-up separating tool and stacked on a delivery unit. The multiple-ups are generally stacked as individual piles on the delivery pile. To increase the stability of the individual piles, a, preferably unprocessed, sheet is preferably inserted into or deposited on the pile and/or the individual piles. The sheet insert unit is in particular arranged in the sheet processing machine for this purpose.

Such a device for stacking sheets and/or multiple-ups is known from DE 195 16 023 B4 and DE 195 16 023 A1. In particular, an intermediate sheet cartridge including a supply pile of unprocessed sheets is shown there. Furthermore, a rake for transporting such a sheet into a deposit pile is shown. In particular, an unprocessed sheet is deposited there as the intermediate sheet onto the delivery pile.

A pile formation device for the insertion into a sheet pile as a non-stop device is known from DE 10 2015 218 145 A1. The pile formation device is preferably configured as a rake, a roller rack, or a panel. In particular, the roller rack comprises multiple consecutively arranged members, e.g., rollers, pipes, or rods. At the end faces, the members are rotatably mounted at the chains.

ES 2 064 222 A2 discloses a sheet processing machine comprising a pile formation device. The pile formation device comprises one or two stacking rakes for temporarily storing multiple-ups/sheets. An embodiment of the pile formation device as a conveyor belt is disclosed; however, its configuration is not explained.

EP 2 840 047 A1 discloses a palletizing machine for various materials, such as corrugated cardboard or the like. The patent specification discloses a pile formation means and a deposit element.

DE 26 30 094 A1 discloses a sheet processing machine comprising a pile formation device. DE 26 30 094 A1 describes a non-stop device, which facilitates pile changing. The pile formation device is arranged beneath the lower multiple-up separating tool.

EP 2 452 790 A1 discloses a processing station for a die-cutting machine and a method for removing sample sheets. A multiple-up separating mechanism comprises an upper tool and a lower tool.

A sheet delivery of a rotary printing press is known from JP S61 64662. A sensor recognizes the position of a pile formation device 11D3, and the pile formation device can be controlled, especially vertically, by means of the signal.

JP H0565951 U discloses a pile formation device of a cutting or die-cutting machine. The pile formation device discloses a main fork/rake as well as an auxiliary fork.

DE 63 23 077 A1 discloses a pile formation device comprising a bar grid and sliding belts. The bars are as capable of sliding as much as possible, or comprise a sliding belt, to ensure that the sheet or sheets coming directly in contact with the bars is or are subjected to as little loading as possible when pulled out. The belts are rotatably mounted on rollers for this purpose. The bars can be extended by means of a transport device, which is not shown.

SUMMARY

It is the object of the invention to devise a sheet processing machine comprising at least one pile formation device, and a method for forming piles.

The object is attained according to the invention by the plane of the lower multiple-up separating tool being arranged beneath all the means that delimit the recesses and/or a spatial area of the individual piles and/or the piles in the lower multiple-up separating tool, and that, in the temporary storage position, the plane of the at least one pile formation device has a first distance with respect to the plane of the lower multiple-up separating tool, and that, in the further temporary storage position, the plane of the at least one pile formation device is arranged having an increased distance with respect to the plane of the lower multiple-up separating too. Further, in the method, the plane of the lower multiple-up separating tool is arranged beneath all the means that delimit the recesses and/or a spatial area of the individual piles and/or the piles in the lower multiple-up separating tool, so as to increase the distance between the plane of the at least one pile formation device and the plane of the lower multiple-up separating tool. The at least one pile formation device is displaced relative to the at least one lower multiple-up separating tool counter to a vertical direction by means of a lifting device. To increase the temporary storage capacity, the at least one pile formation device is displaced counter to the vertical direction from the temporary storage position at a first distance between the plane of the at least one lower multiple-up separating tool and the plane of the at least one pile formation device into a further temporary storage position at an increased distance between the plane of the at least one lower multiple-up separating tool and the plane of the at least one pile formation device.

The advantages to be achieved with the invention are, in particular, that an improved pile formation device for the, preferably non-stop, pile formation is created. As a result of the configuration, in particular lower idle times and/or fewer stoppages of the sheet processing machine are required. In particular, a degree of automation can thus be increased, and a machine operating time can be extended. Due to a vertically displaceable arrangement of the pile formation device, a temporary storage capacity of sheets can be increased. In particular, a temporary storage capacity can be increased so drastically, for example, that a delivery pile can be changed without machine idle time.

During an outward-moving step, in particular a pile formation step, a temporary storage pile of sheets and/or multiple-ups and/or individual piles of multiple-ups is deposited on a stacking element and/or delivery pile. During this outward-moving step, a displacement and/or sliding of at least one temporary storage pile is prevented and/or at least decreased by a relative movement of at least one pile formation means and at least one transport means.

Another advantage to be achieved with the invention lies in the pile formation device being configured with a horizontally movable pile formation device. During the intermediate sheet insertion, a sheet is already located on the pile formation device during an inward-moving step. In particular, the intermediate sheet insertion step as well as a temporary storage can thus be implemented by means of a pile formation device. In particular, a compact configuration can be achieved. In particular, a second pile formation device can thus be dispensed with.

Another advantage to be achieved with the invention is the compact arrangement of the drives for the at least one pile formation means and the at least one deposit element. These are, in particular, arranged so as to be fixed to the frame and/or immovable in the sheet insert unit. In this way, in particular a more compact configuration of the pile formation device is possible. During the various relative movements, in particular no drive thus has to be moved. In this way, in particular a thin configuration of the pile formation means is possible. The configuration of the at least one pile formation device becomes particularly compact with the preferred configuration of a coaxial shaft. The drives preferably drive the coaxial shaft. In this way, a relative movement of the at least one pile formation means and of the at least one deposit element is achieved by way of linearly guided guide elements.

Another advantage to be achieved with the invention is that a tool change, in particular of a lower multiple-up separating tool, is facilitated by the pile formation device since the pile formation device can be arranged spaced apart from the multiple-up separating tool. The pile formation device can be displaced in the vertical direction by means of a lifting device, and a lower multiple-up separating tool can thus be guided to the intended position.

BRIEF DESCRIPTION OF THE DRAWINGS

Exemplary embodiments of the invention are illustrated in the drawings and will be described in greater detail below. The drawings show.

DETAILED DESCRIPTION

Figure 1:
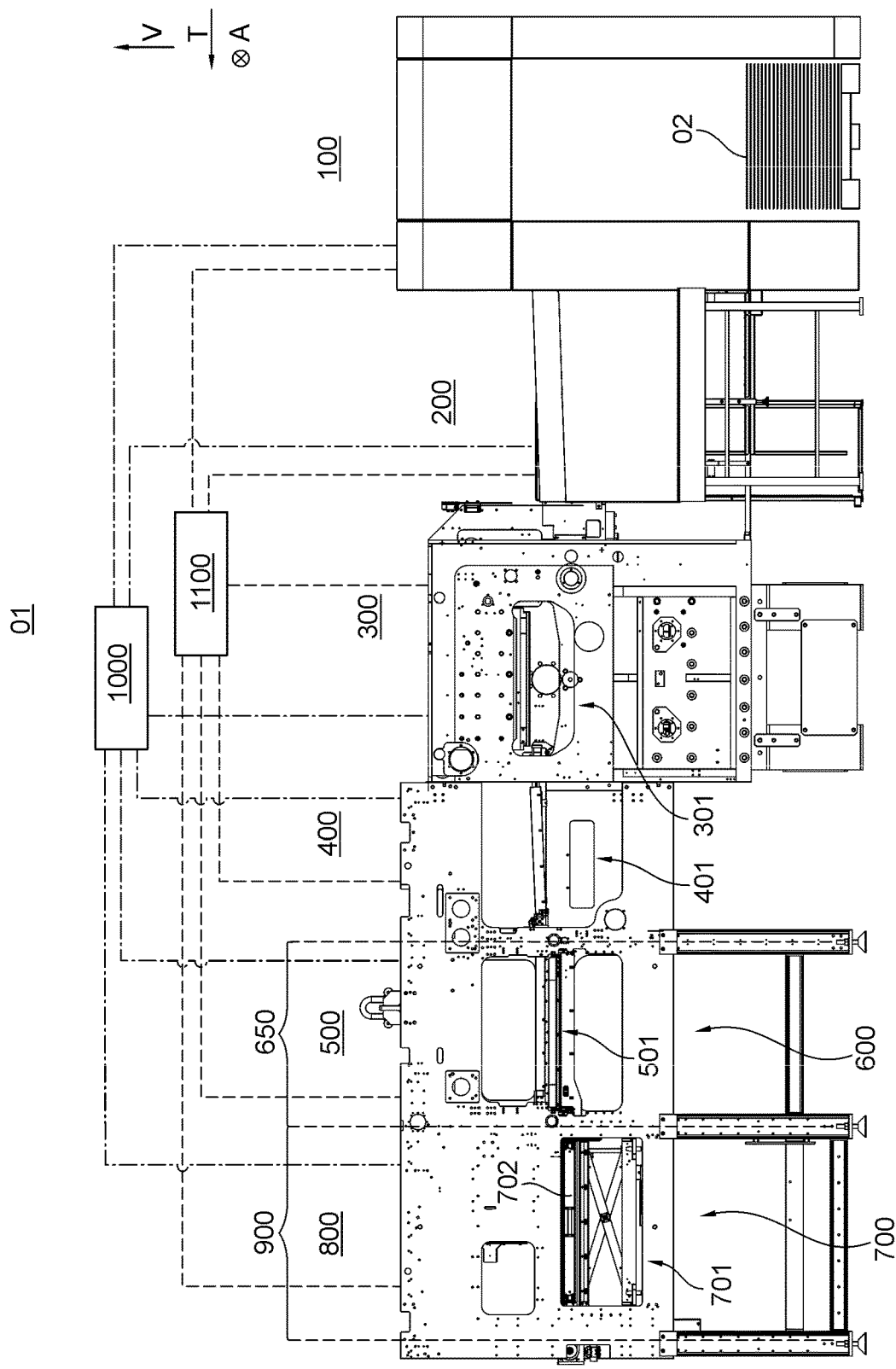
FIG. 1 an illustration of a sheet processing machine in a preferred embodiment in a side view.
Figure 2:
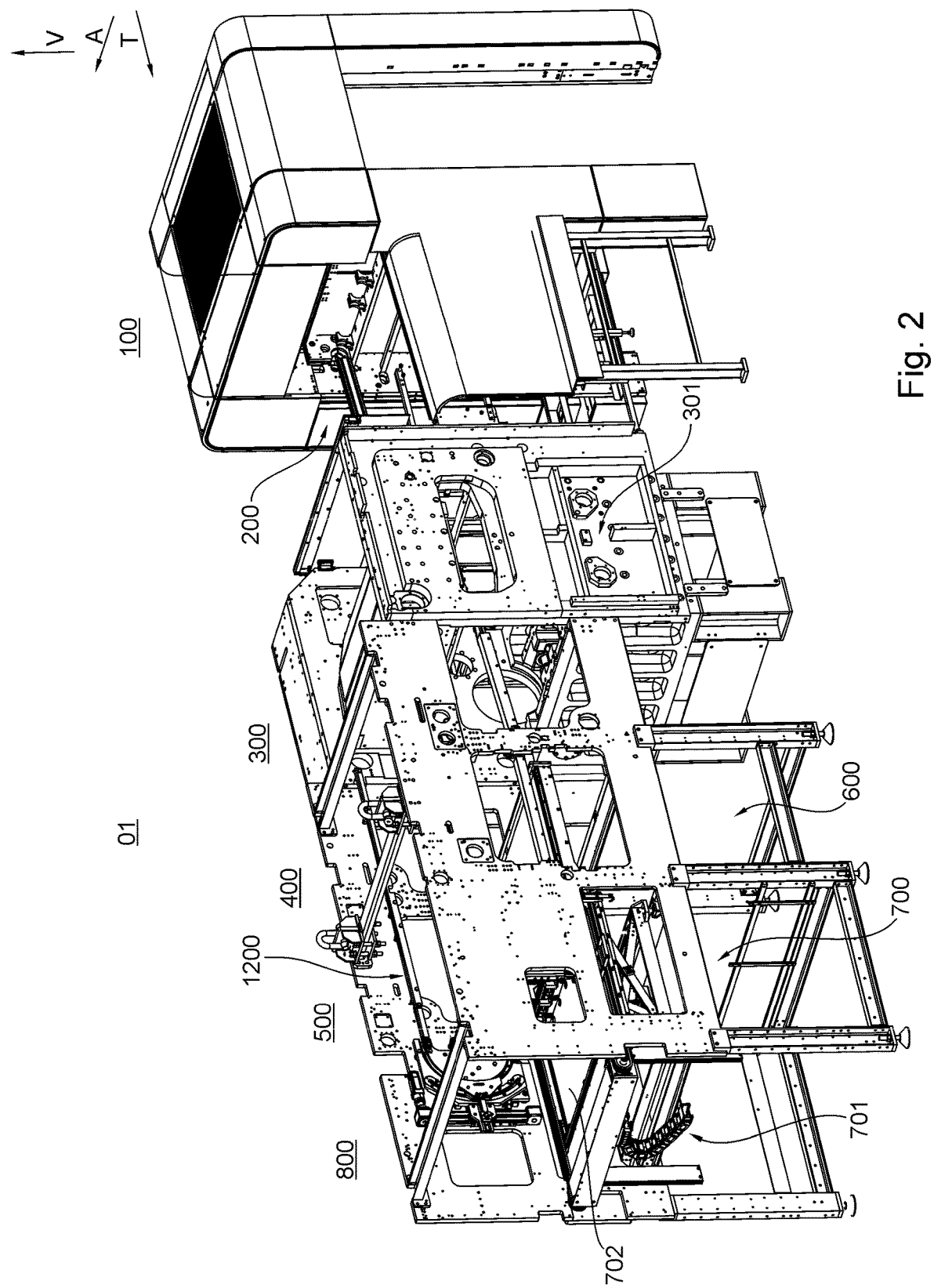
FIG. 2 a perspective illustration of the sheet processing machine in a preferred embodiment.
Figure 3:
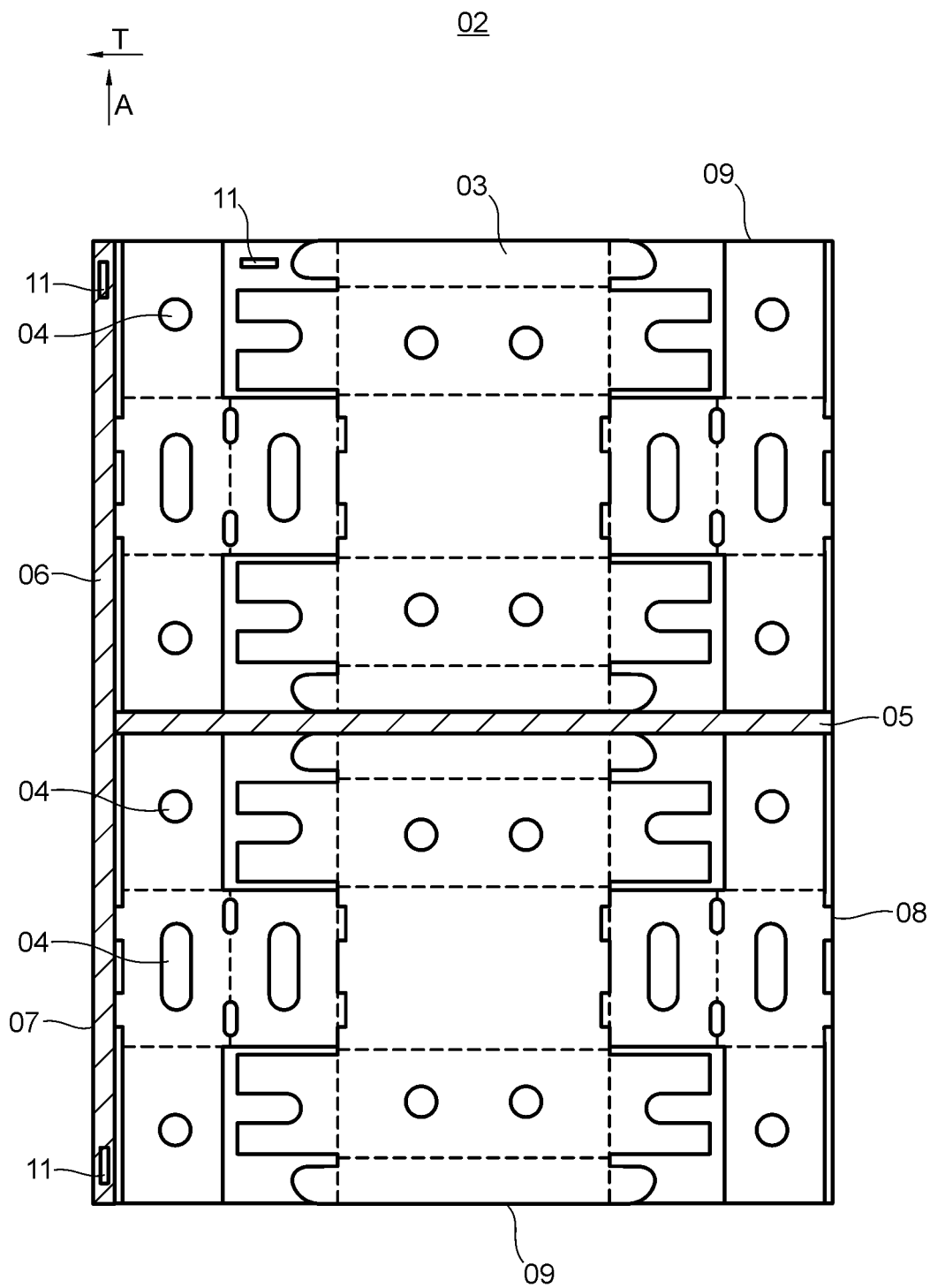
FIG. 3 a schematic illustration of a sheet and several multiple-up copies.
Figure 4:
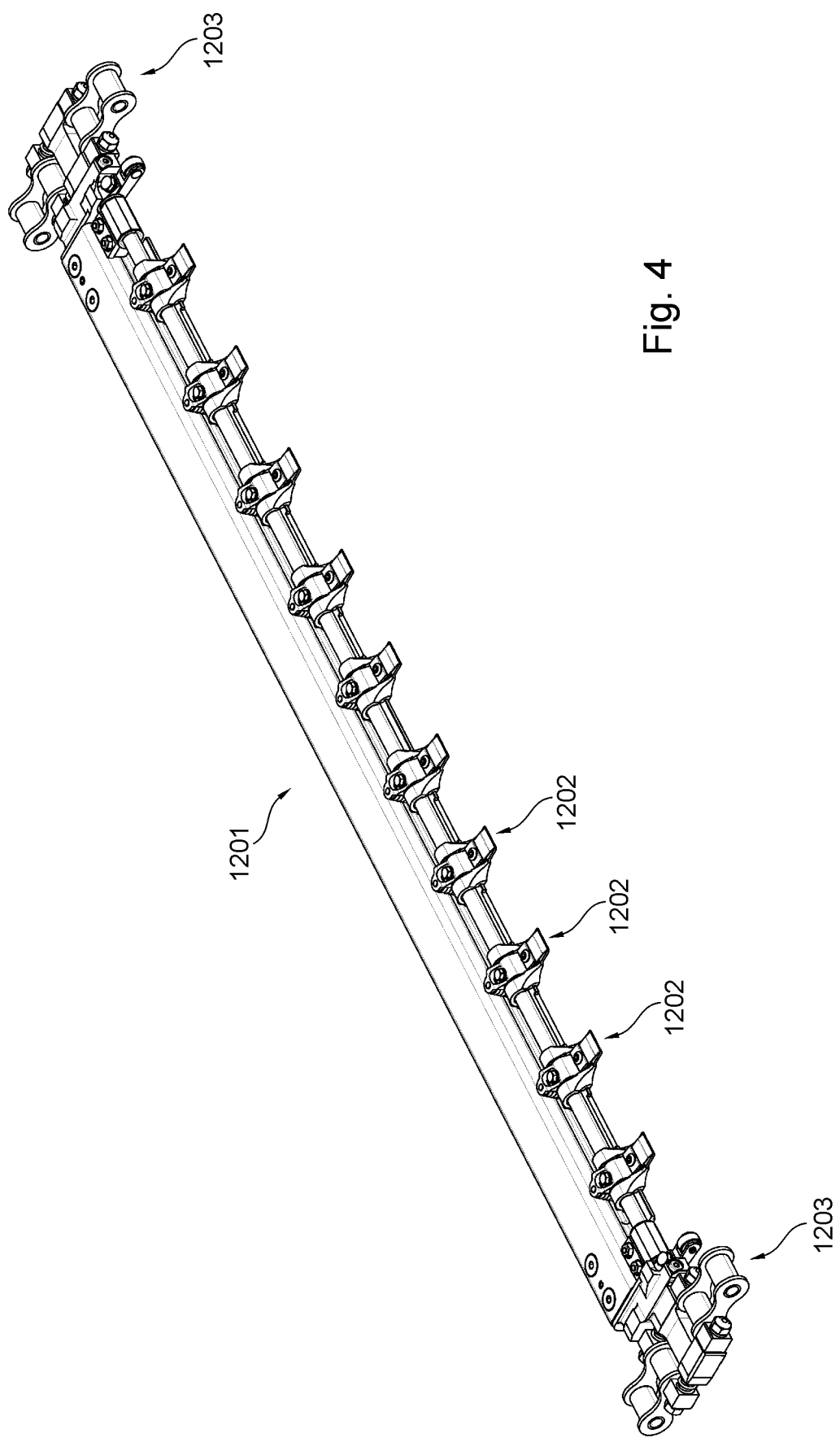
FIG. 4 a perspective illustration of a chain gripper carriage in a preferred embodiment.
Figure 5:
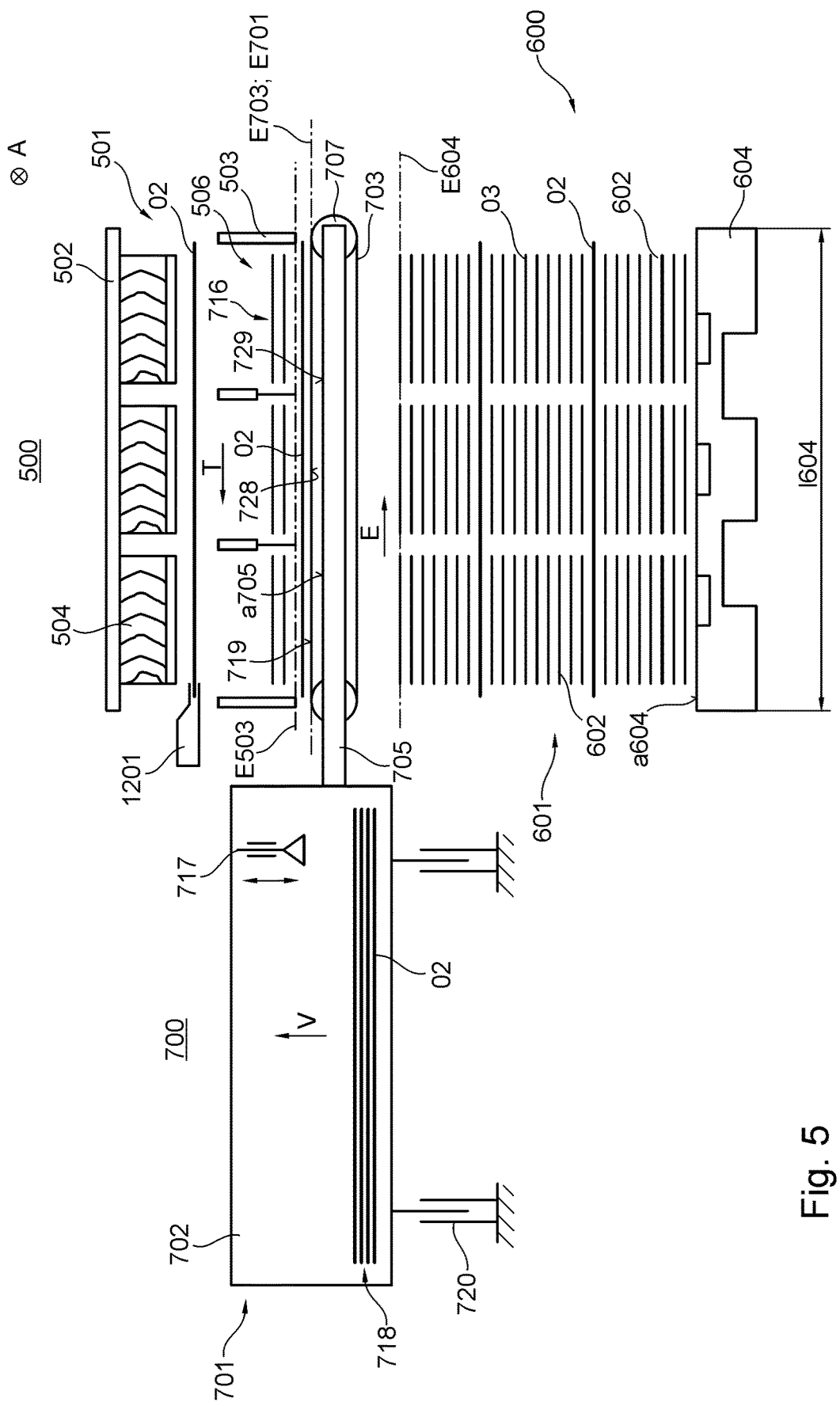
FIG. 5 a schematic illustration of the sheet insert unit of the delivery unit and of the multiple-up separating unit.
Figure 6:
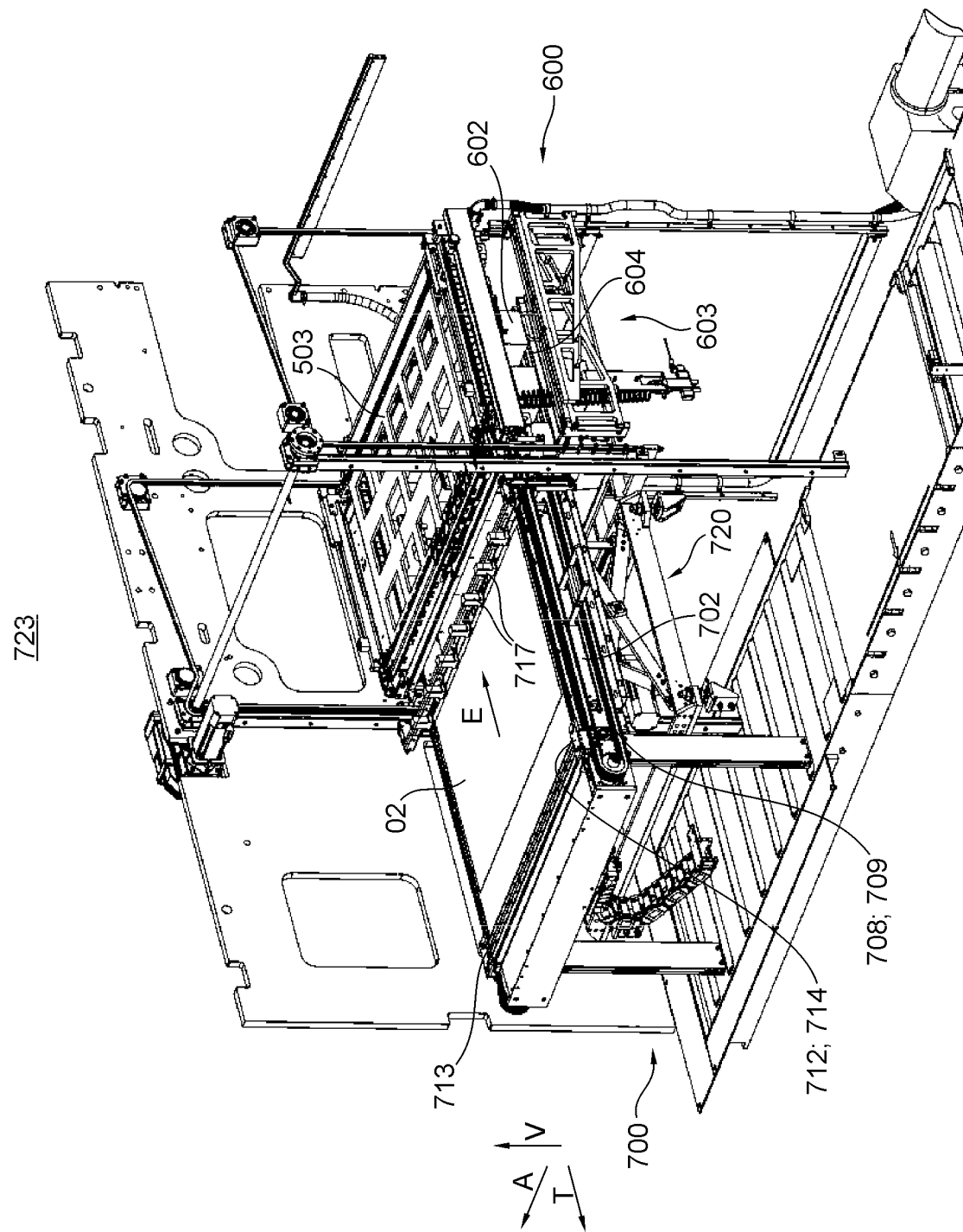
FIG. 6 a perspective illustration of a possible embodiment of the pile formation unit comprising a pile formation device in the inward-moving position.
Figure 7:
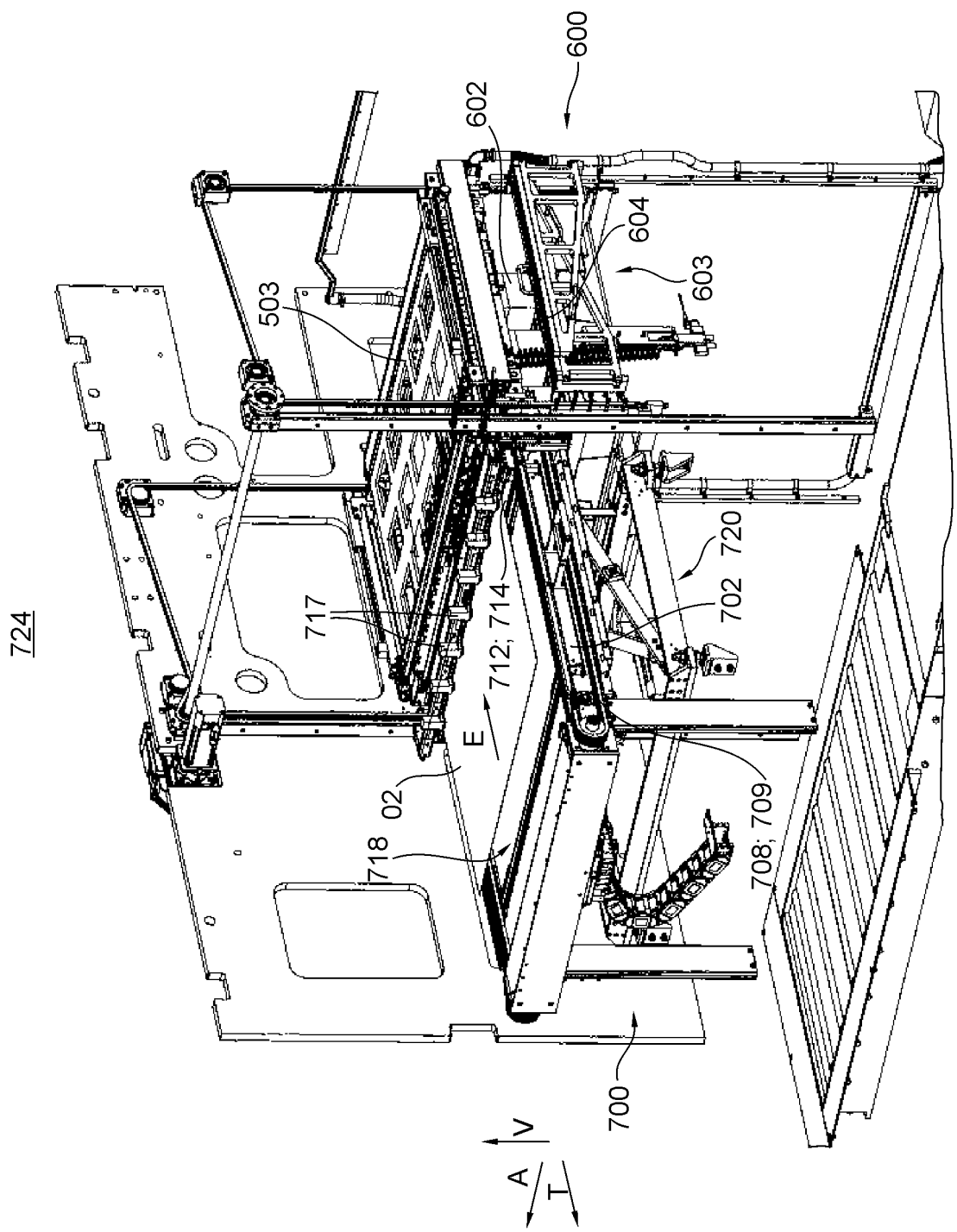
FIG. 7 a perspective illustration of a possible embodiment of the pile formation unit comprising a pile formation device in the temporary storage position.
Figure 8:
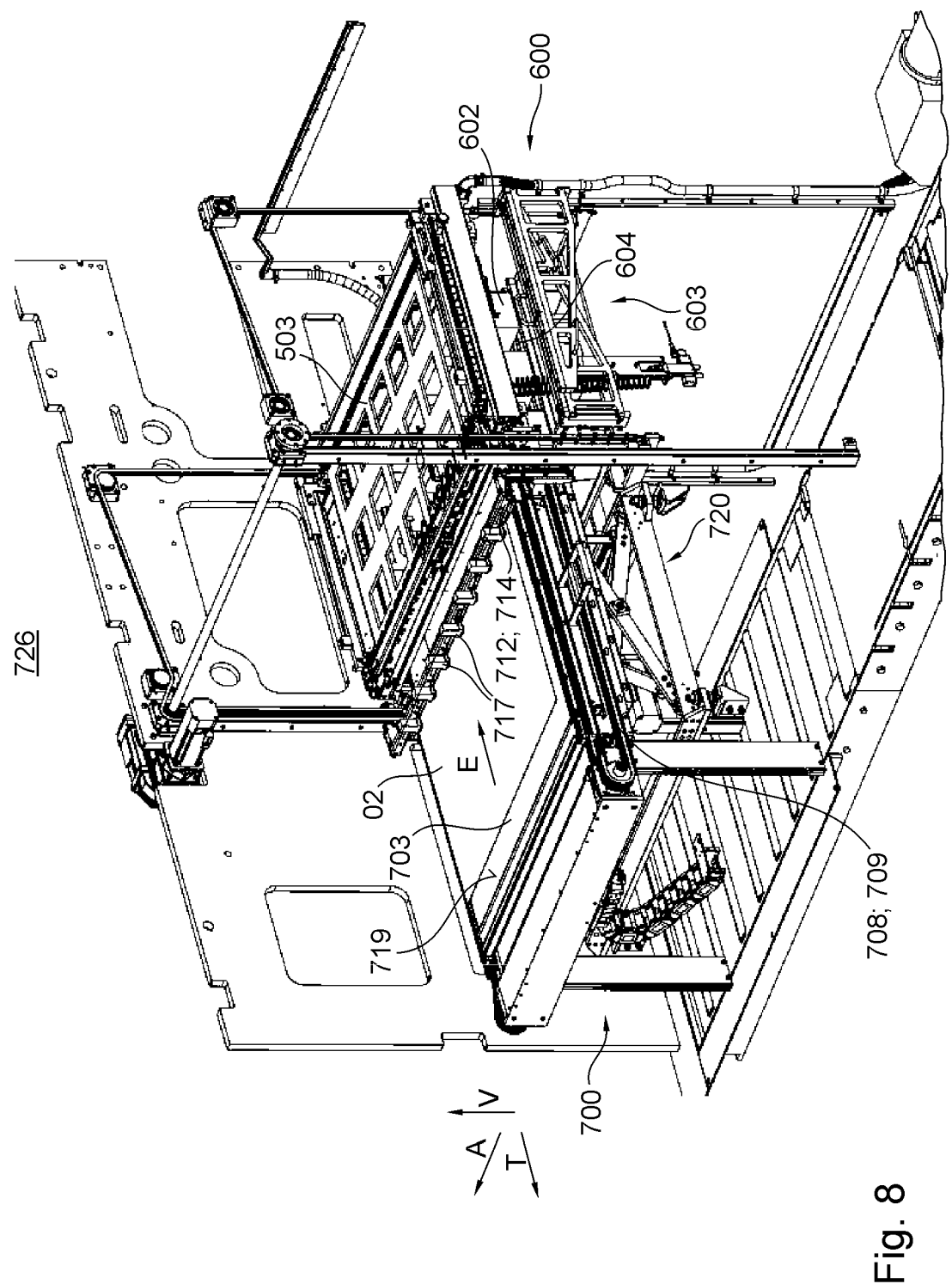
FIG. 8 a perspective illustration of a possible embodiment of the pile formation unit comprising a pile formation device in the outward-moving position.
Figure 9:
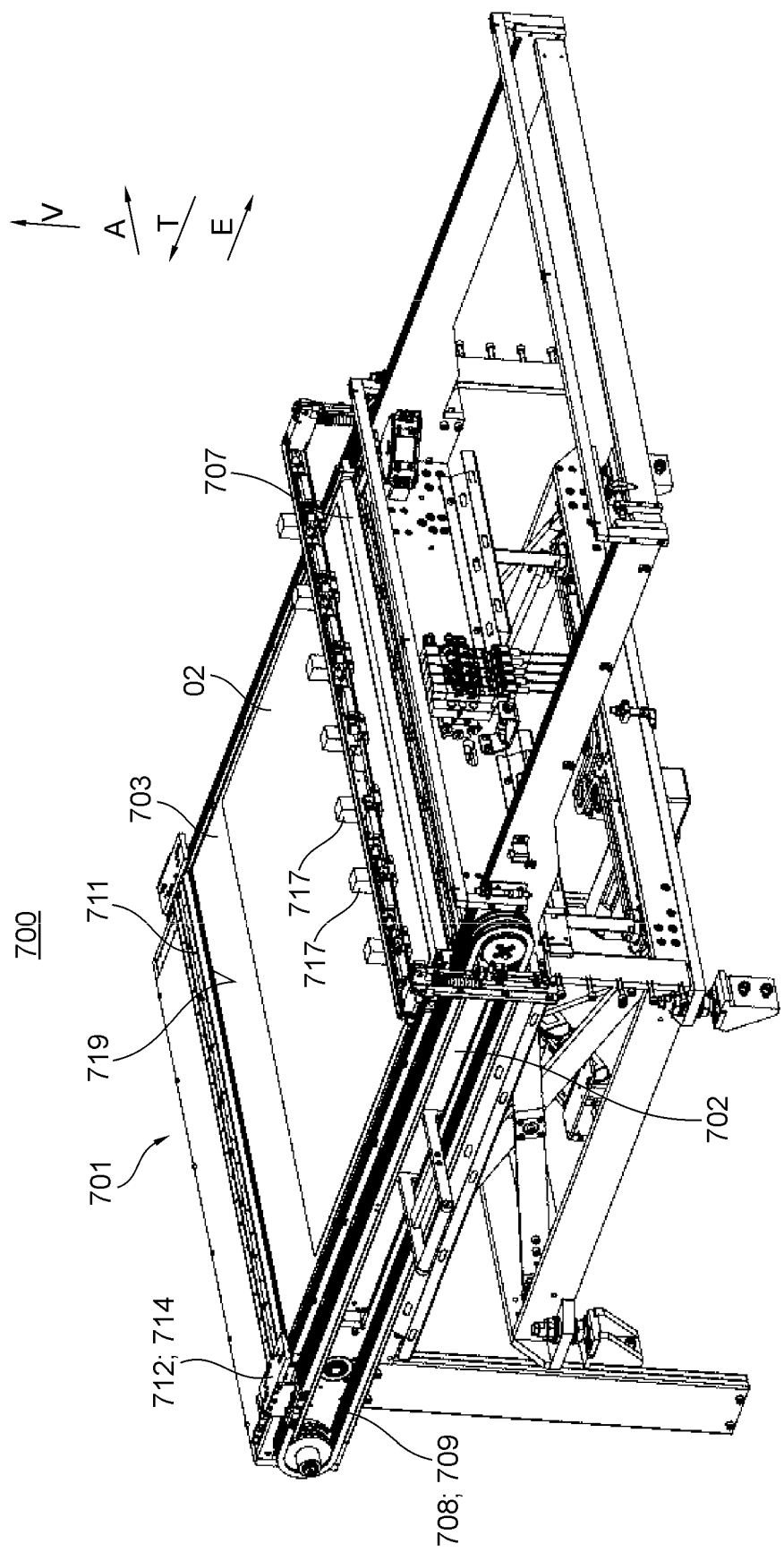
FIG. 9 a perspective illustration of a possible embodiment of the pile formation unit.
Figure 10:
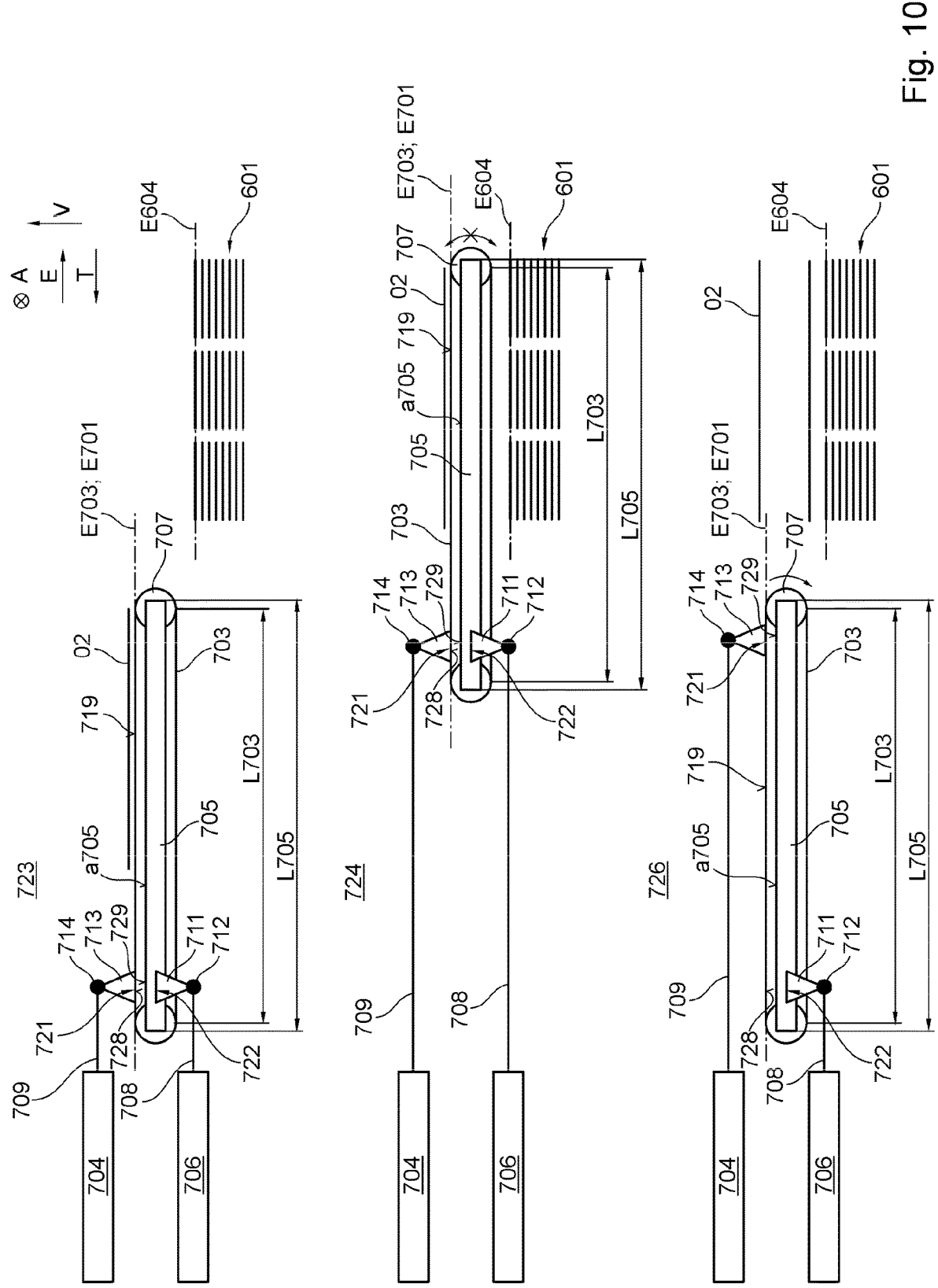
FIG. 10 a schematic illustration of the various positions of the pile formation device.
Figure 11:
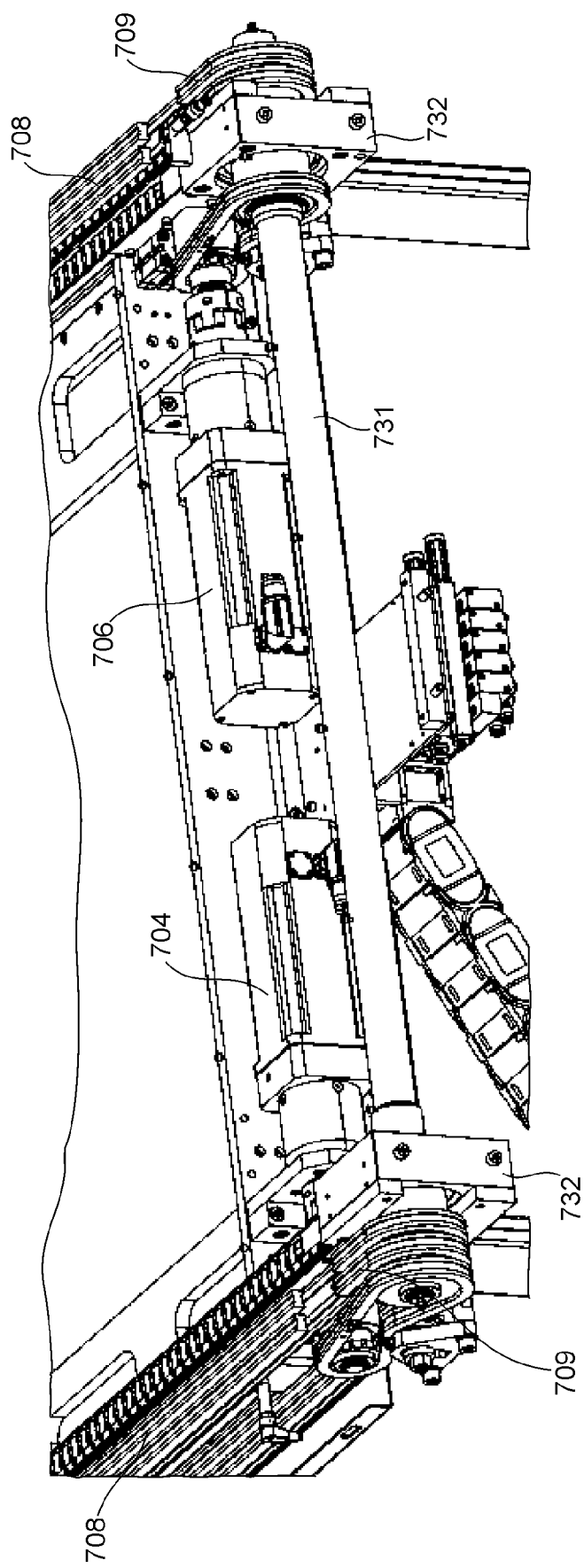
FIG. 11 a perspective illustration of a possible embodiment of the connection of the drives to the drawing means.

A processing machine 01 is preferably configured as a sheet processing machine 01, in particular as a die-cutting machine 01, more preferably as a flat-bed die-cutting machine 01, for processing sheet-like substrate 02 or sheets 02. Above and below, processing machine 01 and/or sheet processing machine 01 also refers to die-cutting machine 01.

The processing machine 01 comprises at least one unit 100; 200; 300; 400; 500; 600; 650; 700; 800; 900, preferably a multiplicity of units 100; 200; 300; 400; 500; 600; 650; 700; 800; 900. The processing machine 01, in particular the sheet processing machine 01, preferably comprises at least one unit 300, configured as a shaping unit 300, for processing sheets 02.

Unless an explicit distinction is made, the term sheet-like substrate 02, specifically the term sheet 02, shall generally be understood to encompass any planar substrate 02 that is present in section, i.e., also substrate 02 present in panel- or boards-shaped form, i.e., also panels or boards. The sheet-like substrate 02 or the sheet 02 thus defined is made, for example, of cardboard and/or corrugated cardboard, i.e., cardboard sheets and/or corrugated cardboard sheets, or sheets, panels or possibly boards made of plastic, cardboard, glass, wood, or metal. The sheet-like substrate 02 is more preferably paper and/or paperboard, in particular paper and/or paperboard sheets. Above and below, the term sheet 02 refers, in particular, both to sheets 02 that were not yet processed by means of at least one unit 300; 400; 500; 650, and to sheets 02 that were already processed by means of at least one unit 300; 400; 500; 650 and, in the process, were potentially modified in terms of their shape and/or their mass.

According to DIN 6730 (February 2011), paper is a flat material, consisting mainly of fibers derived from vegetable sources, which is formed by the dewatering of a fiber suspension on a sieve. In the process, a card web is created, which is subsequently dried. The basis weight of paper is preferably a maximum of 225 g/m² (two hundred and twenty-five grams per square meter).

According to DIN 6730 (February 2011), cardboard is a flat material, consisting mainly of fibers derived from vegetable sources, which is formed by the dewatering of a fiber suspension on a sieve or between two sieves. The fiber structure is compressed and dried. Cardboard is preferably manufactured from cellulose by gluing or pressing the cellulose together. Cardboard is preferably configured as solid board or corrugated cardboard. The basis weight of cardboard is preferably more than 225 g/m² (two hundred and twenty-five grams per square meter). Corrugated cardboard is cardboard made of one or more layers of corrugated paper that is glued to one layer or between multiple layers of another, preferably smooth, paper or cardboard.

Above and below, the term paperboard preferably refers to a sheet material that is preferably primed on one side and made of paper, having a basis weight of at least 150 g/m² (one hundred fifty grams per square meter) and no more than 600 g/m² (six hundred grams per square meter). Paperboard preferably has high strength relative to paper.

A sheet 02 to be worked preferably has a grammage of at least 70 g/m² (seventy grams per square meter) and/or of no more than 700 g/m² (seven hundred grams per square meter), preferably no more than 500 g/m² (five hundred grams per square meter), more preferably no more than 200 g/m² (two hundred grams per square meter). A sheet 02 to be worked preferably has a thickness of no more than 1 cm (one centimeter), preferably no more than 0.7 cm (zero point seven centimeters), more preferably no more than 0.5 cm (zero point five centimeters), more preferably no more than 0.3 cm (zero point three centimeters).

Above and below, the term multiple-up preferably refers to the number of identical and/or different objects that are produced from the same piece of material and/or are arranged on joint substrate material, for example a joint sheet 02. A multiple-up 03 is preferably the region of a sheet 02 that is either configured as a product of the sheet processing machine 01, in particular as an intermediate product for producing an end product, and/or, for example, is further worked and/or is configured to be further workable to a desired or required end product. The desired or required end product here, which is preferably generated by further working the respective multiple-up 03, is preferably a packaging, in particular a folding box.

Above and below, an offcut piece 04; 05; 06 is the region of a sheet 02 that does not correspond to any multiple-up 03. Collected offcut pieces 04; 05; 06 are preferably referred to as scrap. An offcut piece 04; 05; 06 is preferably configured and/or removable as trim-off and/or broken-off pieces. During the operation of the sheet processing machine 01, the at least one offcut piece 04; 05; 06 is preferably generated in at least one shaping unit 300, preferably by at least one processing step of the respective sheet 02, for example in at least one die-cutting process. During the operation of the sheet processing machine 01, the at least one offcut piece 04; 05; 06 is preferably at least partially removed from the respective sheet 02, and is thus, in particular, separated from the respective multiple-up 03 of the sheet 02. Preferably, at least one unit 400 configured as a stripping unit 400 is configured to remove at least one first offcut piece 04, in particular at least one scrap piece 04, and/or is configured to remove at least one scrap piece 04. Preferably, at least one unit 500 configured as a multiple-up separating unit 500 is configured to remove at least one second offcut piece 06, in particular at least one gripper edge 06, and/or is configured to remove at least one gripper edge 06. For example, a sheet 02 comprises an offcut piece 05 configured as a crosspiece 05. In particular, the multiple-ups 03 are spaced apart from one another by the at least one crosspiece 05.

The spatial area provided for transporting a sheet 02, which the sheet 02, if present, at least temporarily occupies, is the transport path. The transport path is established, at least in a section, by at least one component of a system 1200 configured as a transport system 1200.

A transport direction T is a direction T which is intended for a shaping operating mode of at least one shaping unit 300 of the processing machine 01 and in which the sheet 02, if present, is transported at each point of the transport path. The transport direction T intended, in particular, for transporting sheets 02 is a direction T that is preferably oriented at least substantially horizontally, and more preferably completely horizontally. In addition or as an alternative, the transport direction T preferably points from a first unit 100 of the processing machine 01 to a last unit 800; 900 of the processing machine 01. In particular, the transport direction T points from a unit 100, in particular a feeder unit 100, on the one hand to a unit 600, in particular to a delivery unit 600, on the other hand. In addition or as an alternative, the transport direction T preferably points in a direction in which the sheets 02 are transported, apart from vertical movements or vertical components of movements, in particular from a first contact with a unit 200; 300; 400; 500; 600; 650; 700; 800; 900 of the processing machine 01 arranged downstream from the feeder unit 100 or a first contact with the processing machine 01 to a last contact with the processing machine 01. The transport direction T is preferably the direction T in which a horizontal component points in a direction that is oriented from the feeder unit 100 to the delivery unit 600. The transport direction T preferably points from a feeder side to a delivery side.

The feeder side preferably corresponds to the end face of the sheet processing machine 01, preferably the side on which the at least one feeder unit 100 is arranged. The side of the sheet processing machine 01 located opposite the feeder side preferably corresponds to the delivery side. In particular, the last unit 800; 900 of the sheet processing machine 01, preferably the at least one joint unit 900 and/or the at least one offcut piece delivery unit 800 are arranged on the delivery side. The feeder side and the delivery side are preferably arranged parallel to a direction A, in particular a transverse direction A, and a working width.

The transverse direction A is preferably a horizontally extending direction A. The transverse direction A is oriented orthogonally to the intended transport direction T of the sheets 02 and/or orthogonally to the intended transport path of the sheets 02 through the at least one unit 100; 200; 300; 400; 500; 600; 650; 700; 800; 900 of the processing machine 01. The transverse direction A is preferably oriented from an operator side of the processing machine 01 to a drive side of the processing machine 01.

A vertical direction V is preferably the direction V that is arranged orthogonally to a plane spanned by the transport direction T and the transverse direction A. The vertical direction V is preferably oriented perpendicularly from the bottom and/or from a bottom of the processing machine 01 and/or from a lowermost component of the processing machine 01 toward the top and/or to an uppermost component of the processing machine 01 and/or to an uppermost cover of the processing machine 01.

The operator side of the processing machine 01 is preferably the side of the processing machine 01, parallel to the transport direction T, from which an operator, at least partially and at least temporarily, has access to the individual units 100; 200; 300; 400; 500; 600; 650; 700; 800; 900 of the processing machine 01, for example during maintenance work and/or when replacing at least one shaping tool.

The drive side of the processing machine 01 is preferably the side of the processing machine 01, parallel to the transport direction T, which is located opposite the operator side. The drive side preferably comprises at least portions, preferably at least a majority, of a system 1000, in particular of a drive system 1000.

Above and below, the working width is the maximum width that a sheet 02 can have to be able to be transported through the at least one unit 100; 200; 300; 400; 500; 600; 650; 700; 800; 900, in particular the respective units 100; 200; 300; 400; 500; 600; 650; 700; 800; 900, of the processing machine 01, and/or to still be able to be worked by way of the at least one shaping unit 300 of the processing machine 01; this thus corresponds to the maximum width of the respective sheet 02 that can be worked by way of the at least one shaping unit 300 of the processing machine 01. The working width of the processing machine 01, in particular sheet processing machine 01, is preferably at least 30 cm (thirty centimeters), more preferably at least 50 cm (fifty centimeters), still more preferably at least 80 cm (eighty centimeters), still more preferably at least 120 cm (one hundred twenty centimeters), and still more preferably at least 150 cm (one hundred fifty centimeters).

The sheet 02 to be processed preferably has a sheet width, preferably parallel to the transverse direction A, of at least 200 mm (two hundred millimeters), preferably at least 300 mm (three hundred millimeters), more preferably at least 400 mm (four hundred millimeters).

The sheet width is preferably no more than 1,500 mm (one thousand five hundred millimeters), more preferably no more than 1,300 mm (one thousand three hundred millimeters), still more preferably no more than 1,060 mm (one thousand sixty millimeters). A sheet length, preferably parallel to the transport direction A, is, for example, at least 150 mm (one hundred fifty millimeters), preferably at least 250 mm (two hundred fifty millimeters), more preferably at least 350 mm (three hundred fifty millimeters). Furthermore, a sheet length is, for example, no more than 1,200 mm (one thousand two hundred millimeters), preferably no more than 1,000 mm (one thousand millimeters), more preferably no more than 800 mm (eight hundred millimeters).

A sheet 02 has multiple edges 07; 08; 09. In particular, an edge 07 configured as a leading edge 07 is located at the front of the sheet 02 in the transport direction, and is arranged parallel to the transverse direction A. In particular, the leading edge 07 is the edge 07 of the respective sheet 02 which can preferably be seized by at least one component of the sheet processing machine 01, in particular by at least one holding element 1202 of the transport system 1200, for transporting the respective sheet 02, and/or at which at least one component of the sheet processing machine 01 seizes the respective sheet 02, in particular by way of the at least one holding element 1202 of the transport system 1200. An edge 08 configured as a trailing edge 08 is preferably arranged opposite the leading edge 07. More preferably, the leading edge 07 and the trailing edge 08 are arranged parallel to one another. In particular, a trailing edge 08 is located at the rear of the sheet 02 in the transport direction T, and is arranged parallel to the transverse direction A. The sheet 02 furthermore has two edges 09 configured as side edges 09. The two side edges 09 are preferably arranged parallel to the transport direction T and orthogonally to the transverse direction A. Each of the side edges 09 is preferably arranged orthogonally to the leading edge 07 and/or to the trailing edge 08 of the sheet 02.

The sheet 02 preferably includes at least one print image. Above and below, the print image describes a representation on the sheet 02 which corresponds to the sum of all image elements, with the image elements having been transferred and/or being transferable to the sheet 02 during at least one working stage and/or at least one printing operation, preferably prior to being processed by the processing machine 01. The surface of the sheet 02 preferably includes at least one unprinted region, in particular an unprinted edge region. In particular, the at least one holding element 1202 preferably holds the sheet 02 at least at the unprinted edge region of the trailing edge 07, which is configured as an offcut piece 06 and/or a gripper edge 06.

The sheet 02 preferably includes at least one printing mark 11, preferably at least two printing marks 11. Above and below, a printing mark 11 is a mark, for example, for monitoring a color register and/or a perfecting register and/or preferably for aligning the sheet 02 in the transport direction T and/or the transverse direction A.

A unit 100; 200; 300; 400; 500; 600; 650; 700; 800; 900 shall, in each case, preferably be understood to mean a group of devices that functionally cooperate, in particular to be able to carry out a preferably self-contained processing operation of at least one substrate 02. A unit 100; 200; 300; 400; 500; 600; 650; 700; 800; 900 in each case preferably encompasses a machine section of the processing machine 01, which is preferably arranged so as to be at least partially separable from further machine sections.

A system 1000; 1100; 1200 of the processing machine 01 is preferably at least one device that is at least temporarily, in particular permanently, in contact and/or can interact with and/or can be functionally connected to at least one unit 100; 200; 300; 400; 500; 600; 650; 700; 800; 900, preferably at least two different units 100; 200; 300; 400; 500; 600; 650; 700; 800; 900 of the processing machine 01.

The processing machine 01 preferably comprises at least one unit 100 configured as a feeder unit 100. The feeder unit 100 is preferably configured as a feeder 100, more preferably as a sheet feeder 100, more preferably as a sheet feeder unit 100. The feeder unit 100 is preferably configured as the first unit 100 of the processing machine 01 in the transport direction T. The feeder unit 100 is preferably configured to feed sheets 02 to the processing machine 01 on the transport path and/or configured to feed sheets 02 to at least one unit 200; 300; 400; 500; 600; 650; 700; 800; 900 arranged downstream from the feeder unit 100 in the transport direction T.

At least one unit 200 configured as an infeed unit 200 is preferably arranged downstream from the at least one feeder unit 100 in the transport direction T. The at least one infeed unit 200 is preferably configured to feed sheets 02, preferably from a sequential supply of sheets 02, to the at least one shaping unit 300. The at least one infeed unit 200 preferably comprises at least one device for detecting sheets 02. A respective sheet 02 can preferably be at least partially, preferably completely, aligned by the at least one infeed unit 200 with respect to its position in the transport direction T and/or in the transverse direction A.

At least one unit 300 configured as a shaping unit 300 is preferably arranged downstream from the at least one feeder unit 100 in the transport direction T, and preferably downstream from the at least one infeed unit 200. The at least one shaping unit 300 preferably comprises at least one shaping mechanism 301. The shaping mechanism 301 is preferably configured as a die-cutting mechanism 301, more preferably as a flat-bed die-cutting mechanism 301. The corresponding unit 300 is then preferably configured as a die-cutting unit 300 and/or a creasing unit 300 and/or a cutting unit 300 and/or a die cutter 300, more preferably as a flat-bed die-cutting unit 300 and/or a flat-bed die-cutter 300.

Above and below, a device for partially severing and/or reducing the thickness of and/or stripping away the sheet 02 to be processed, in particular of the packaging material, is referred to as a creasing unit 300. In particular, notches and/or creases are introduced into the preferably paper-containing or paperboard-containing packaging material, in particular the sheet 02. In the case of corrugated cardboard, for example, the uppermost layer is severed in at least one creasing unit 300. In particular, the sheet 02, in particular the packaging material, can thus preferably be bent and/or folded into a certain shape, for example a three-dimensional shape, with lower force expenditure. A device for severing, preferably for completely severing, the sheet 02, in particular the packaging material, at certain points is referred to as a cutting unit 300 or a die-cutting unit 300. In particular, the at least one offcut piece 04; 05; 06, in particular the packaging material that is not required, can thus subsequently be easily separated from the multiple-ups 03.

The at least one shaping mechanism 301 preferably comprises at least one upper shaping tool, in particular at least one upper die-cutting tool, and/or at least one lower shaping tool, in particular at least one lower die-cutting tool. The at least one upper shaping tool is preferably in each case assigned at least one lower shaping tool, preferably exactly one lower shaping tool. At least one shaping tool is preferably configured to be movable, preferably movable in the vertical direction V. More preferably, at least one upper shaping tool and/or at least one lower shaping tool is in each case configured to be movable in the vertical direction V. The at least one upper shaping tool and the at least one lower shaping tool are preferably synchronized with respect to one another, and in particular with respect to the multiple-up 03 and/or the sheet 02. Preferably, in particular when both the at least one upper shaping tool and the at least one lower shaping tool are configured to be movable, the movement of respective shaping tools is preferably synchronized and/or can be synchronized in terms of time. The respective upper shaping tool and the respective lower shaping tool preferably have opposing relative movements with respect to one another during a die-cutting operation, so that the shaping tools are moved and/or can be moved relative toward one another and/or away from one another in the vertical direction V. The at least one upper shaping tool is preferably at least temporarily, preferably at least once per machine cycle, more preferably in a closed position of the at least one shaping mechanism 301, in direct contact with the at least one lower shaping tool. The at least one upper shaping tool is preferably spaced apart from the at least one lower shaping tool at a distance of greater than zero in an open position of the shaping mechanism 301.

The processing machine 01 preferably comprises at least one drive system 1000. The respective shaping tool is preferably in contact with, preferably functionally connected to, the at least one drive system 1000 and/or can be at least temporarily driven, preferably by way of a cyclical movement, by the drive system 1000.

A sheet 02 that has been processed by the at least one shaping unit 300, i.e., that is arranged downstream from the at least one shaping unit 300 on the transport path in the transport direction T, preferably includes at least one die-cut impression. The at least one die-cut impression is configured as a crease and/or a score mark and/or an embossment and/or a cut and/or a perforation, for example. The at least one die-cut impression, in particular when it is configured as a perforation and/or a cut, is preferably configured to at least partially separate the at least one multiple-up 03 from at least one offcut piece 04; 05; 06 and/or from at least one further multiple-up 03 of the relevant sheet 02. A sheet 02 that has been processed by the at least one shaping unit 300, i.e., that is arranged downstream from the at least one shaping unit 300 on the transport path in the transport direction T, preferably comprises the at least one multiple-up 03, preferably at least two multiple-ups 03, and at least one offcut piece 04; 05; 06.

At least one unit 400 configured as a stripping unit 400 is arranged downstream from the at least one shaping unit 300 in the transport direction T, preferably subsequent to the at least one shaping unit 300, more preferably without a further unit of the processing machine 01 being interposed. The at least one stripping unit 400 is preferably configured to remove the at least one first offcut piece 04, preferably to remove the at least one scrap piece 04, from the respective sheet 02. The at least one stripping unit 400 preferably comprises at least one stripping mechanism 401.

A sheet 02 that has been processed by the at least one stripping unit 400, i.e., that is arranged downstream from the at least one stripping unit 400 on the transport path in the transport direction T, preferably only comprises the at least one multiple-up 03, in particular a multiplicity of multiple-ups 03, and the at least one second offcut piece 06. For example, the sheet 02 that has been processed by the at least one stripping unit 400 additionally comprises the at least one crosspiece 05.

At least one unit 500 configured as a multiple-up separating unit 500 is preferably arranged downstream from the at least one shaping unit 300, in particular the at least one die-cutting unit 300. When the at least one stripping unit 400 is present, the at least one multiple-up separating unit 500 is also arranged downstream from the at least one stripping unit 400 in the transport direction T. The at least one multiple-up separating unit 500 comprises at least one multiple-up separating mechanism 501 for separating the multiple-ups 03 and the at least one remaining offcut piece 05; 06 from one another.

The sheet processing machine 01 furthermore preferably comprises at least one unit 600, in particular a delivery unit 600 for delivering and stacking the multiple-ups 03, more preferably a delivery 600. In the transport path of the sheets 02, the at least one delivery unit 600 is arranged downstream from the at least one die-cutting unit 300, and more preferably the at least one multiple-up separating unit 500 and/or the at least one stripping unit 400. In a preferred embodiment, the at least one multiple-up separating unit 500 comprises the at least one delivery unit 600, with the two units 500; 600 preferably being configured as a joint unit 650.

Furthermore, the sheet processing machine 01 preferably comprises the at least one unit 700, which is preferably configured as a sheet insert unit 700. The at least one sheet insert unit 700 is preferably assigned to the at least one multiple-up separating unit 500, and more preferably is arranged downstream from the at least one multiple-up separating unit 500 in the transport direction T. The at least one sheet insert unit 700 preferably inserts at least one sheet 02, preferably at least one unprocessed sheet 02, into a pile of sheets 02 and/or multiple-ups 03, which are preferably separated from one another, to increase the stability. The sheet processing machine 01, in particular, comprises the sheet insert unit 700 for inserting a sheet 02 into a pile of multiple-ups 03. The sheet insert unit 700 preferably comprises at least one pile formation device 701. Furthermore, the at least one pile formation unit 700 comprises at least one sheet cartridge 702, in particular an intermediate sheet cartridge 702, for holding, preferably unprocessed, sheets 02. The sheet insert unit 700 can also be arranged downstream from the joint unit 650.

Furthermore, the sheet processing machine 01 preferably comprises at least one unit 800 for collecting offcut piece 05; 06 configured as an offcut piece delivery unit 800. In particular, the at least one offcut piece 05; 06 is separated from the at least one multiple-up 03, preferably all multiple-ups 03. The at least one offcut piece delivery unit 800 is preferably arranged downstream from the multiple-up separating unit 700 in the transport direction T. More preferably, the at least one offcut piece delivery unit 800 is arranged downstream from the at least one delivery unit 600. In a preferred embodiment, the at least one offcut piece delivery unit 800 is encompassed by the at least one sheet insert unit 700, and these are configured as a joint unit 900.

The at least one drive system 1000 is preferably functionally connected to at least one system 1100, in particular a control system 1100, and/or the at least one transport system 1200.

The at least one drive system 1000 preferably comprises at least one clock generator and/or angular position transducer, more preferably exactly one clock generator and/or angular position transducer. The at least one clock generator and/or angular position transducer is preferably configured to generate a guide value, for example a virtual guide value and/or a guide value in the form of pulses, by way of which movements of components of the processing machine 01 can be synchronized and/or are synchronized.

Furthermore, the at least one sheet processing machine 01 comprises at least one system 1200 configured as a transport system 1200. The at least one transport system 1200 guides the sheets 02, preferably continuously holding them, through the sheet processing machine 01 and, in particular, at least through the units 300; 400; 500; 650. In particular, the sheets 02 are preferably guided at least substantially horizontally in the transport direction T through the sheet processing machine 01. The transport system 1200 is preferably configured as a chain transport system 1200, and more preferably as a chain gripper system 1200. In particular, the at least one chain transport system 1200 comprises at least one guide device 1203, wherein the at least one guide device 1203 is preferably configured as at least one chain 1203. In particular, the at least one guide device 1203 is at least partially, preferably completely, arranged outside the transport path. The chain gripper system 1200 is preferably configured with at least one carriage, preferably with multiple carriages, 1201, in particular a gripper carriage 1201. In particular, the at least one guide device 1203 holds the at least one gripper carriage 1201, preferably all gripper carriages 1201, and establishes the position of the at least one gripper carriage 1201 in at least one transport system 1200. In particular, the respective gripper carriage 1201, during sheet guidance, has a position in the transport direction T that is predefined by the at least one guide device 1203. The at least one holding element 1202, in particular the at least one gripper 1202, is preferably arranged at each carriage 1201. In particular, each gripper carriage 1201 comprises multiple holding elements 1202, preferably grippers 1202, in the transverse direction A across the working width, preferably at equal distances with respect to one another. The at least one holding element 1202 is preferably transferred from an open position into a closed position for gripping a sheet 02. A sheet 02 is preferably seized by the at least one holding element 1202 at the transfer position of the at least one infeed unit 200. For depositing the at least one second offcut piece 06, preferably in the at least one offcut piece delivery unit 800, the at least one holding element 1202 is preferably transferred from a closed position into an open position. The chain gripper system 1200 preferably has a cyclical and/or periodic movement for transporting sheets through the units 300; 400; 500; 650. In particular, the movement is configured to be so periodic and/or cyclical that the sheet 02 and/or the gripper carriage 1201, in particular the chain gripper carriage 1201, are at a standstill during the processing step in one of the units 300; 400; 500; 650. In particular, the at least one chain gripper carriage 1201 and/or the sheet 02 are in motion between the individual processing steps. The transport system 1200 is coupled to and synchronized with the transport means of the individual units via the control system 1100 and the drive system 1000.

The at least one drive system 1000 preferably comprises at least one drive. For example, the at least one drive is configured as a central drive of the processing machine 01. The drive system 1000 preferably comprises a drive configured as a central drive. The at least one drive is preferably configured to transmit torque and/or linear movement to at least one component of at least one unit 100; 200; 300; 400; 500; 600; 650; 700; 800; 900, for example at least one transport means, and/or to at least one component of the transport system 1200. The at least one drive is preferably configured to transmit torque and/or linear movement to at least two different components of the same unit 100; 200; 300; 400; 500; 600; 650; 700; 800; 900 and/or two different units 100; 200; 300; 400; 500; 600; 650; 700; 800; 900 and/or to at least one component of the transport system 1200. The at least one drive is preferably in contact with and/or functionally connected to at least one component of at least one unit 100; 200; 300; 400; 500; 600; 650; 700; 800;

900 which is to be moved at least temporarily and/or at least one component of the transport system 1200. The at least one drive of the at least one drive system 1000 is preferably linked, or can be linked, to at least one component of at least one unit 100; 200; 300; 400; 500; 600; 650; 700; 800; 900 to be moved, preferably to all components of the respective unit 100; 200; 300; 400; 500; 600; 650; 700; 800; 900, or of the respective units 100; 200; 300; 400; 500; 600; 650; 700; 800; 900, which are to be moved by the respective drive, and/or to at least one component of the transport system 1200 to be moved, in such a way that the respective component to be moved, and preferably all components to be moved by the drive, can be operated and/or are operated in a synchronized manner.

The at least one drive system 1000 is preferably configured to transmit cyclical and/or periodic movements to at least one component of at least one unit 100; 200; 300; 400; 500; 600; 650; 700; 800; 900 and/or of the transport system 1200 by way of the at least one drive.

In a preferred embodiment, the at least one drive system 1000 comprises exactly one drive, which is preferably linked to different components of different units 100; 200; 300; 400; 500; 600; 650; 700; 800; 900 and/or to at least one component of the transport system 1200.

The at least one drive of the drive system 1000 is preferably configured as an electric motor, more preferably as a servo motor.

The sheet processing machine 01 preferably comprises at least one system 1100, in particular at least one control system 1100 for open-loop and/or for closed-loop control. The at least one control system 1100 is functionally connected to the units 100; 200; 300, 400; 500; 600; 650; 700; 800; 900 and the at least one drive, for example. The multiple units 100; 200; 300; 400; 500; 600; 650; 700; 800; 900 are preferably functionally connected to one another via the at least one control system 1100 and are synchronized and/or can be synchronized. The sheet processing machine 01 comprises multiple sensors, wherein the input signals thereof are detected and processed in at least one control system 1100. For example, at least one output signal is generated via the at least one control system 1100, which controls, by open-loop and/or closed-loop control, at least one component of a unit 100; 200; 300, 400; 500; 600; 650; 700; 800; 900, and/or is connected to a component of a unit 100; 200; 300, 400; 500; 600; 650; 700; 800; 900 so as to control the same by open-loop and/or closed-loop control. For example, the at least one drive of the at least one drive system 1000 and/or an alignment of sheets 02 and/or an infeed of sheets 02 into the processing machine 01 and/or an insertion of sheets into the at least one delivery pile 601 can be controlled, by open-loop control and/or closed-loop control, via the at least one control system 1100. An operator can, for example, at least partially intervene in the mode of operation of the sheet processing machine 01 via a control console that is functionally connected to the at least one control system 1100.

The at least one stripping unit 400 preferably comprises at least one stripping mechanism 401. The at least one stripping mechanism 401 preferably comprises at least one upper stripping tool and/or at least one lower stripping tool, wherein the respective stripping tool is preferably configured in each case to be movable in the vertical direction V. The upper stripping tool is preferably configured to be movable with a vertical relative movement with respect to the lower stripping tool. The at least one upper stripping tool and the at least one lower stripping tool are preferably configured to be movable relative toward one another and/or away from one another in the vertical direction V. The at least one upper stripping tool and the at least one lower stripping tool are preferably synchronized with respect to one another, and in particular with respect to the multiple-up 03 and/or sheet 02. The at least one upper stripping tool is preferably at least temporarily, preferably at least once per machine cycle, more preferably in a closed position of the at least one stripping mechanism 401, in direct contact with the at least one lower stripping tool. The at least one upper stripping tool is preferably spaced apart from the at least one lower stripping tool at a distance of greater than zero in an open position of the stripping mechanism 401.

The respective stripping tool is preferably in contact with, preferably functionally connected to, the at least one drive system 1000 and/or can be at least temporarily driven, preferably by way of a cyclical movement, by the at least one drive of the drive system 1000. Preferably, the movement of the respective stripping tools is preferably synchronized and/or can be synchronized in terms of time.

Preferably, the at least one first offcut piece 04 can be separated at least partially, preferably completely, from the at least one multiple-up 03 of the sheet 02 and/or can be removed at least partially, preferably completely, from the at least one sheet 02, by closing the respective stripping tools, i.e., by positioning the relevant stripping mechanism 401 in the closed position.

In particular, the at least one multiple-up separating mechanism 501 comprises at least one upper multiple-up separating tool 502 arranged above in the vertical direction V and at least one lower multiple-up separating tool 503 arranged therebeneath. The at least one upper multiple-up separating tool 502 and the at least one lower multiple-up separating tool 503 are preferably synchronized with respect to one another, and in particular with respect to the multiple-up 03. The lower multiple-up separating tool 503 comprises a spatial area 506 for stacking and/or temporarily storing 506 the multiple-ups 03. The at least one upper multiple-up separating tool 502 preferably comprises at least one pushing device 504, in particular a pushing device 504 configured as an elevation 504 of the at least one upper multiple-up separating tool 502. The at least one pushing device 504 is configured so as to be protrudable and, in a closed position of the at least one multiple-up separating mechanism 501, to protrude into the spatial area 506, in particular into a recess 506, of the at least one lower multiple-up separating tool 503. The transport path of the sheet 02, established by the transport system 1200, in particular by the transport system 1200 configured as a chain gripper system 1200, through the at least one multiple-up separating unit 500 is preferably arranged between the at least one upper multiple-up separating tool 502 and the at least one lower multiple-up separating tool 503 in an open position of the relevant multiple-up separating mechanism 501. In a closed position of the relevant multiple-up separating mechanism 501, at least the upper multiple-up separating tool 502 is arranged so as to penetrate into the transport path of the sheet 02. The multiple-ups 03 are separated from the remaining offcut pieces 05; 06 by changing the position of the at least one multiple-up separating mechanism 500, preferably only of the upper multiple-up separating tool 502, from the open position into the closed position. In particular, a multiple-up 03 is thus arranged so as to be detached from contact with the at least one transport system 1200. This process is, in particular, repeated cyclically and/or periodically by coupling to the at least one drive system 1000. In particular, the position of the at least one multiple-up separating mechanism 501 is changed exactly whenever a sheet 02 is situated in the transport path beneath the at least one upper multiple-up separating tool 502.

In this preferred embodiment, the at least one delivery 600 is, in particular, arranged in the vertical direction V beneath the lower multiple-up separating tool 503. The multiple-ups 03 are preferably stacked on at least one pile 601, preferably at least one delivery pile 601, after having been temporarily stored 506 in the lower multiple-up separating tool 503. The at least one delivery pile 601 preferably comprises at least two, preferably a multiplicity, of individual piles 602 of multiple-ups 03 next to one another. The at least one delivery pile 601 is preferably arranged so as to be movable and/or displaceable in the vertical direction V by means of a lifting device 603. In particular, it is thus possible to adapt the height of the at least one delivery pile 601, for example, to the lower multiple-up separating tool 503 and/or to at least one pile formation device 701.

The at least one pile formation device 701, for the purpose of pile formation, is preferably arranged so as to be movable and/or inwardly movable and/or is arranged so as to move and/or inwardly move between the lower multiple-up separating tool 503 and the at least one delivery pile 601. This is in particular the case when the at least one temporary storage device 506 of the at least one lower multiple-up separating tool 503 in the at least one multiple-up separating unit 500 is at least partially, preferably completely, filled with multiple-ups 03 and/or has a sufficiently great instability so that at least one individual pile 602 is at risk of tilting. In particular, the at least one lifting device 603 is preferably matched to the at least one pile formation device 701 and is in particular arranged in the vertical direction V beneath the at least one pile formation device 701, preferably without any further device being interposed.

In particular, the offcut pieces 05; 06 in the at least one offcut piece delivery unit 800 are detached by at least one holding element 1202, in particular at least one gripper 1202, of the at least one transport system 1200 and collected as scrap by means of at least one collection device. For example, this at least one collection device is configured as at least one conveyor belt comprising at least one collection container.

The insertion of sheets of the at least one sheet insert unit 700 is described in greater detail below. The sheet processing machine 01 comprises at least one pile formation device 701 in the sheet insert unit 700. The at least one pile formation device 701 is arranged, for example, for temporarily storing 506 multiple individual piles 602 of multiple-ups 03 or for transporting a sheet 02, in particular a sheet 02 for intermediate sheet insertion. The at least one pile formation device 701 furthermore preferably comprises at least one pile formation means 705 and at least one deposit element 703. The at least one pile formation means 705 is in particular arranged for depositing sheets 02 in the at least one pile formation device 701. Depending on the configuration, the sheets 02 and/or multiple-ups 03 and/or individual piles 602 of multiple-ups 03 rest either directly on the at least one pile formation means 705 or directly on the at least one deposit element 703.

The at least one pile formation means 705 is preferably at least partially horizontally arranged. "Horizontally arranged" denotes, in particular, a parallel arrangement to a plane that is spanned by the transport direction T and the transverse direction A. The at least one pile formation means 705 is preferably arranged so as to be displaceable by means of at least one drive 706. Preferably, the at least one pile formation means 705 is preferably arranged so as to be at least horizontally displaceable by means of at least one drive 706. "Horizontally displaceable" preferably denotes an arrangement that is displaceable parallel to the plane spanned by the transport direction T and the transverse direction A. The at least one pile formation means 705 is preferably arranged to be displaceable in or counter to an inward-moving direction E. The inward-moving direction E preferably extends parallel to the plane that is spanned by the transport direction T and the transverse direction A. The inward-moving direction E is in particular arranged so as to be oriented from the at least one pile formation device 701 to a stacking element 604. The at least one drive 706 is preferably arranged so as to be fixed to the frame and/or immovable at the at least one pile formation device 701 and/or at the frame of the at least one pile formation device 701. In particular, the at least one drive 706 of the at least one pile formation device 705 is arranged so as to remain in position and/or remains in position when the at least one deposit element 703 and/or the at least one pile formation means 705 are transferred from a first position into a second position. The at least one drive 706 is in particular not moved when the at least one deposit element 703 is displaced relative to the at least one pile formation means 705. The at least one pile formation means 705 is in particular functionally connected to the at least one drive 706 via at least one connecting element 711 and/or at least one guide element 712 and/or at least one linear guide 708. The at least one pile formation means 705 comprises at least one connecting element 711 that is fixed to the at least one pile formation means 705. The at least one connecting element 711 is preferably fixedly arranged relative to the at least one pile formation means 705.

The at least one pile formation means 705 is arranged to be displaceable by means of at least one linearly guided guide element 712. The at least one connecting element 711 is preferably functionally connected to at least one linear guide 708 via the at least one guide element 712. The at least one linear guide 708 is in particular configured so as to be at least partially linearly and horizontally guided. The at least one guide element 712 is in particular arranged so as to be linearly and horizontally displaceable and is fixedly connected relative to the at least one connecting element 711. Such a connecting element 711 is configured as a fastening strip, for example, and is attached and/or arranged so as to be attached to the at least one pile formation means 705, for example by means of screws and/or other fastening means. The at least one connecting element 711 of the at least one pile formation means 705 is functionally connected to the at least one drive 706 via the at least one linearly guided guide element 712. The at least one linear guide 708 is preferably configured as a revolving drawing means 708, for example as a chain. The at least one drawing means 708 preferably has at least a partially linear progression. In particular, the drawing means 708, during in the at least partially linear progression, preferably runs in a horizontal plane, parallel to the plane that is spanned by the transport direction T and the transverse direction A. The at least one guide element 712 is preferably arranged on this at least one partially linear progression and, in particular, is fixedly arranged relative to the linear guide 708 and/or the drawing means 708. The at least one horizontally guided guide element 712 is in particular arranged so as to be displaceable via the linear guide 708.

The at least one pile formation means 705 preferably has a length 1705 and a width. The length 1705 of the at least one pile formation means 705 preferably corresponds to the dimension of the at least one pile formation means 705 parallel to the inward-moving direction E. The length 1705 of the at least one pile formation means 705 preferably corresponds to a length 1604 of the at least one stacking element 604, in particular of the at least one delivery element 604. More preferably, the length 1705 is shorter or longer, in particular no more than 30% shorter or longer, than the length 1604 of the at least one stacking element 604, in particular of the at least one delivery element 604. The length 1604 is preferably longer than a length of a sheet 02 to be processed. More preferably, the length 1604 has at least a length of a pile 601, in particular of a delivery pile 601, of multiple-ups 03.

The width of the at least one pile formation means 705 preferably corresponds to a width of the at least one stacking element 604, in particular of the at least one delivery element 604. More preferably, the width is shorter or longer, in particular no more than 30% shorter or longer, than the width of the at least one stacking element 604, in particular of the at least one delivery element 604. In a preferred embodiment, the width and the length are situated parallel to the transverse direction A. In particular, the width of the at least one stacking element 604, in particular of the at least one delivery element 604, preferably corresponds at least to the working width, in particular the maximum working width, of the sheet processing machine 01.

In another embodiment, the width of multiple stacking elements 604 together corresponds at least to the maximum working width of the sheet processing machine 01. More preferably, the width of the at least one stacking element 604 is at least the width of one sheet 02. The length 1604 of the at least one stacking element 604, in particular of the at last one delivery element 604, and the length 1705 of the at least one pile formation means 705 are preferably situated parallel to the transport direction T. Preferably, the length 1604 of the at least one stacking element 604 corresponds preferably to no more than a length 1600 of a delivery unit 600.

The at least one pile formation means 705 furthermore has a surface a705. The maximum surface a705 of the at least one pile formation means 705 preferably corresponds at least to a maximum surface a604 of the at least one stacking element 604 and/or the at least one delivery element 604. In particular, the surface a604 denotes the surface of the stacking element 604 which corresponds to the length 1604 of the at least one stacking element 604 multiplied by the width of the at least one stacking element 604.

The at least one pile formation device 701 furthermore comprises at least one deposit element 703. The at least one deposit element 703 is preferably configured as a transport means 703, and more preferably as an at least partially or completely linearly configured transport means 703, preferably parallel to the transport direction T and/or to the inward-moving direction E. In particular, the linear configuration of the at least one at least partially linearly configured transport means 703 is oriented in one direction. The main component of this direction is in particular arranged parallel to the inward-moving direction E or to the transport direction T. When the at least one at least partially linearly configured transport means 703 is linearly configured in multiple directions, in particular the direction having the longest extension is the direction whose main component of this direction is arranged parallel to the inward-moving direction E or to the transport direction T. The at least one at least partially linearly configured transport means 703 in particular has at least a minor curvature, in particular in the linearly configured part. Preferably, a radius of curvature is greater than 10 m, more preferably greater than 50 m, and still more preferably greater than 500 m. In particular, the at least one transport means 703 includes at least one bearing surface 719. The at least one bearing surface 719 is in particular the surface that is in contact with a sheet 02 and/or a pile of multiple-ups 03. The bearing surface 719 is preferably at least partially, more preferably completely, horizontally configured. The bearing surface 719 is in particular arranged in the at least partially linearly configured region of the at least one transport means 703. For example, configured horizontally at least with one component. "Horizontal" denotes, in particular, the parallel arrangement to the plane that is spanned by the transport direction T and transverse direction A. More preferably, the at least one bearing surface 719 is at least partially arranged parallel to the at least one pile formation means 705. The at least one bearing surface 719 is preferably the side facing away from the at least one pile formation means 705 and the surface that is arranged higher in the vertical direction V. In particular for temporarily storing 506 multiple individual piles 602 of multiple-ups 03.

The at least one at least partially linearly configured transport means 703 furthermore includes a surface 728, in particular contact surface 728, that is located opposite the at least one bearing surface 719. The contact surface 728 is in particular arranged in such a way that the contact surface 728 faces the at least one pile formation means 705. Another surface 729, in particular support surface 729, is arranged on the opposite side on the at least one pile formation means 705. The support surface 729 is preferably arranged so as to be aligned with the contact surface 728. The support surface 729 is in particular the supporting surface on the at least one pile formation means 705, which is arranged to be in contact with the transport means 703 at least when sheets 02 and/or multiple-ups 03 rest thereon.

The at least one linear transport means 703 in particular has at least a length 1703. The length 1703 of the at least partially linear transport means 703 in particular denotes the length 1703 parallel to the inward-moving direction E of the at least one pile formation device 701. More preferably, the length 1703 of the at least one deposit element 703 is the extension of the bearing surface 719 parallel to the inward-moving direction E. The at least partially linear transport means 703 in particular has a shorter length 1703 than a length 1705 of the at least one horizontally displaceable pile formation means 705. More preferably, the at least one partially linear transport means 703 has at least a length 1703 of at least one third of a length 1705 of the at least one pile formation means 705. In one embodiment, the length 1705 and the length 1703 are the same. For example, the bearing surface 719 has at least 20%, preferably 50%, more preferably 80% of the maximum surface a705 of the at least one pile formation means 705.

In a preferred embodiment, at least one sheet 02 and/or at least one multiple-up 03 and/or at least one individual pile 602 of multiple-ups 03 rest directly on the at least one transport means 703, in particular the at least one at least partially linearly configured transport means 703, in particular at least on the bearing surface 719. In particular, the at least one sheet 02 and/or the at least one multiple-up 03 and/or the at least one individual pile 602 of multiple-ups 03 can be moved relative to the at least one pile formation means 705, or can be held in position, by the at least one at least partially linearly configured transport means 703. In particular, a temporarily stored individual pile 602 and/or several individual piles 602 of multiple-ups 03 can thus be stacked and/or deposited, for example, onto a stacking element 604 and/or a delivery pile 601.

The at least one transport means 703, in particular the at least one at least partially linear transport means 703, is preferably configured as a conveyor belt 703. The at least one conveyor belt 703 preferably extends across at least 80% of the width of the at least one pile formation means 705. For example, the at least one conveyor belt 703 preferably comprises at least one deflection means 707, preferably at least two deflection means 707, more preferably exactly two deflection means 707. The at least one deflection means 707 is in particular connected to the at least one pile formation means 705. The at least one deflection means 707 is in particular configured as at least one roller 707 and is, in particular rotatably, mounted on the at least one pile formation means 705.

In another preferred embodiment, the at least one transport means 703 is configured with multiple conveyor belts 703 that are arranged across the transverse direction A.

The at least one conveyor belt 703 is preferably at least partially horizontally arranged. "Horizontally arranged" refers, in particular, to an arrangement parallel to a plane that is spanned by the transport direction T and the transverse direction A. More preferably, "horizontally arranged" denotes a parallel arrangement of a normal vector on a plane E703 of the at least one conveyor belt 703. In particular, the plane E703 is spanned by a connecting line through the two points that are located the highest in the vertical direction V on the edge of a cross-section through the at least one deflection means 707 and along the working width in the transverse direction A.

The at least one at least partially linearly configured transport means 703 is preferably arranged so as to be displaceable, in particular at least partially horizontally displaceable. For example, the at least one at least partially linear transport means 703 is arranged with low friction, due to the at least one mounted deflection means 707. The at least one deflection means 707 is in particular mounted at the at least one pile formation means 705, preferably at the end face. The at least one deflection means 707 is in particular rotatably mounted on the at least one pile formation means 705.

In a preferred embodiment, the at least one transport means 703 is arranged so as to be displaceable, preferably at least partially horizontally, by means of at least one drive 704 and/or by means of at least one further drive 704. In a preferred embodiment, the pile formation means 705 and the at least one deposit element 703 each comprise at least one drive 704; 706. However, embodiments are also provided in which in each case only the at least one pile formation means 705 or the at least one deposit element 703 comprises a drive 704; 706. In the embodiment comprising only at least one drive 704 at the at least one deposit element 703, the at least one drive 704 is then not referred to as a further drive 704, but only as a drive 704. Embodiments comprising the two combinations are useful. For example, a relative movement then takes place as a result of the dead weight of individual piles 602 of multiple-ups 03.

The at least one drive 704 and/or the at least one further drive 704 are preferably arranged to be immovable and/or fixed to the frame. The at least one drive 704 and/or the at least one further drive 704 are preferably arranged at the at least one pile formation device 705 so as to be fixed to the frame and/or to be immovable. The at least one drive 704 and/or the at least one further drive 704 of the at least one deposit element 703 are arranged so as to remain in position when the at least one pile formation means 705 and/or the at least one deposit element 703 are transferred from a first position into a second position. The at least one drive 704 and/or the at least one further drive 704 are held statically in relative terms with respect to the at least one pile formation means 705 and/or are held in position during the displacement of the at least one deposit element 703. For example, the at least one further drive 704 and/or the at least one drive 704 are arranged so as to drive the at least one deflection means 707. In another preferred embodiment, the at least one transport means 703, in particular the at least one partially linearly configured transport means 703, is functionally connected to at least the at least one further drive 704 and/or the at least one drive 704 via at least one connecting element 713 and/or at least one further connecting element 713 and/or via at least one further guide element 714 and/or via at least one further linear guide 709.

The at least one deposit element 703 preferably comprises a connecting element 713 and/or further connecting element 713 fixed to the at least one deposit element 703. The at least one connecting element 713 and/or the at least one further connecting element 713 are preferably fixedly arranged relative to the at least one transport means 703, in particular the at least one partially linearly configured transport means 703. Such a connecting element 713 is configured as a fastening strip, for example, and is attached to the at least one deposit element 703, for example by means of screws and/or other fastening means. The at least one deposit element 703 is arranged so as to be displaceable by means of a linearly guided guide element 714 and/or a further linearly guided guide element 714. The at least one, preferably further, connecting element 713 is preferably functionally connected to at least one, preferably further, linear guide 709 via the at least one, preferably further, guide element 714. The at least one, preferably further, linear guide 709 is in particular configured to be at least partially linearly and horizontally guided. The at least one, preferably further, guide element 714 is in particular arranged so as to be linearly and horizontally displaceable, and is relatively fixedly connected to the at least one, preferably further, connecting element 711. The at least one, preferably further, linear guide 709 is preferably configured as a revolving drawing means 709. The at least one drawing means 709 preferably has at least a partially linear progression. In particular, the at least one drawing means 709, in the at least partially linear progression, preferably runs in a horizontal plane, parallel to the plane that is spanned by the transport direction T and the transverse direction A. The at least one, preferably further, guide element 714 is preferably arranged on this at least one partially linear progression and is, in particular, fixedly arranged relative to the further linear guide 709 and/or the drawing means 709.

The at least one, preferably further, guide element 714 is preferably arranged on the at least one further drawing means 709 so as to be exclusively horizontally displaceable.

In a preferred embodiment, the at least one transport means 703, in particular the at least one at least partially linearly configured transport means 703, and the at least one pile formation means 705 are arranged so as to be displaceable relative to one another. For example, the at least one pile formation means 703 is arranged so as to be displaceable in or counter to the inward-moving direction E by way of the at least one drive 706. For example, the at least one, in particular at least partially linearly configured, transport means 703 is arranged such that it can be held in position by way of a force and is thus displaceably arranged relative to the at least one pile formation means 705. In particular, the at least one, in particular at least partially linearly configured, transport means 703 and the at least one pile formation means 705 are arranged so as to be at least partially revolving and at least partially displaceable in relative terms, by way of a mounting of the at least one deflection means 707 on the pile formation means 705. Such a force can, for example, be provided to be applied onto the at least one transport means 03 by a pile 716, in particular temporary storage pile 716, of sheets 02 and multiple individual piles 602 of multiple-ups 03. In another preferred embodiment, the at least one, in particular at least partially linearly configured, transport means 703 is also arranged to be displaceable via the at least one drive 704 and/or the at least one further drive 704, for example in functional connection with at least one deflection means 707 and/or with a further connecting element 713 that is fixed relative to the at least one, in particular at least partially linearly configured, transport means 703. In particular, the at least one, in particular at least partially linearly configured, transport means 703 and the at least one pile formation means 705 are thus arranged so as to be displaceable relative to one another.

In a preferred embodiment, the at least one drive 706 and/or the at least one further drive 704 are coupled to at least one shaft 731. In particular, the shaft 731, in particular the coaxial shaft 731, has a coaxial arrangement with an outer shaft and/or sleeve and an inner rotatably mounted shaft. The at least one drive 704 and/or the at least one further drive 704 are coupled to the inner shaft, for example. The at least one drive 706 is coupled to the outer shaft, for example. Furthermore, the at least one inner shaft is arranged so as to drive the at least one drawing means 709. For example, the inner shaft is arranged so as to protrude from the outer shaft and/or sleeve at the end face, and is thus arranged so as to drive the at least one drawing means 709 arranged further to the outside. The at least one outer shaft is rotatably arranged in a frame by means of at least one bearing 732. In particular, the outer shaft and/or sleeve are arranged so as to drive the at least one drawing means 708 that is preferably arranged further to the inside. For example, the at least one drive 704 and/or the at least one further drive 704 and the at least one drive 706 is coupled to the outer and inner shafts by means of at least one chain.

In a preferred embodiment, the at least one pile formation means 705 is arranged so as to be adjustable in relative terms by means of the drive 706, and the at least one, in particular the at least partially linearly configured, transport means 703 is arranged so as to be displaceable in relative terms by means of the at least one drive 704 and/or the at least one further drive 704.

In the preferred embodiment comprising a further connecting element 713 that is fixed relative to the at least one, in particular at least partially linearly configured, transport means 703, the at least one, in particular at least partially linearly configured, transport means 703 comprises at least one region 721 that is arranged so as to be preferably exclusively, at least substantially, horizontally displaceable. The at least one region 721 is in particular arranged so as to be displaceable relative to the at least one pile formation means 705. The at least one region 721 is in particular a region 721 that is stationary relative to the at least one, in particular at least partially linearly configured, transport means 703. A maximum horizontal displacement, on the transport means 703, of the region 721, which is stationary relative to the transport means 703, in particular corresponds at least to a quarter of the length 1705 of the at least one pile formation means 705.

The at least one pile formation device 701 is arranged so as to be displaceable into multiple positions. For example, the at least one pile formation device 701 is arranged so as to be displaceable at least into an inward-moving position 723, a temporary storage position 724, and an outward-moving position 726. The at least one pile formation device 701 is in particular also arranged so as to be displaceable into various positions between these positions. For example, in the temporary storage position 724, the at least one pile formation device 701 can be displaced in and/or counter to a vertical direction V in a further temporary storage position.

In an inward-moving position 723, the at least one pile formation device 701 is arranged in the at least one sheet insert unit 700. Preferably, at least one transport element 717 is, more preferably at least multiple transport elements 717 are, arranged in a vertical direction V above the at least one pile formation device 701. Preferably, the multiple transport elements 717 are arranged offset from one another in the transverse direction A, preferably at equal distances across the working width. In particular, the at least one transport element 717 is, in particular the multiple transport elements 717 are, arranged in a vertical direction V above the at least one intermediate sheet cartridge 702. Preferably, a supply pile 718 of sheets 02 is arranged in the at least one intermediate sheet cartridge 702. In particular, the sheets 02 in the supply pile 718 are intended for the insertion of sheets, in particular the insertion of intermediate sheets, into the delivery pile 601. The at least one transport element 717 is preferably configured to at least partially lift a sheet 02 out of the at least one intermediate sheet cartridge 702. The lifting, in particular, takes place in such a way that the at least lifted portion of the sheet 02 is arranged in the vertical direction V above the at least one pile formation device 701. In particular, the at least one transport element 717 is, in particular the multiple transport elements 717 are, configured as at least one suction transport means 717, in particular as multiple suction transport means 717. The at least one suction transport means 717 is in particular configured as at least one suction transport means 717 for at least partially applying suction to a sheet 02 from a supply pile 718 of the at least one intermediate sheet cartridge 702.

In particular, the at least one pile formation device 701, in an inward-moving position 723, comprises at least one region 721 that is stationary and/or static, in relative terms, and/or fixed relative to the at least one transport means 703. The region 721 that is stationary relative to the at least one transport means 703 is arranged so as to be displaceable relative to the at least one pile formation means 705. The at least one region 721 is in particular the region 721 on which the at least one further connecting element 713 is arranged. The at least one region 721 is arranged with at least one further region 722 that is stationary relative to the at least one pile formation means 705. The at least one further region 722 is formed as a projection of the at least one region 721 in the vertical direction V onto the at least one pile formation means 705 and, in particular, the two regions 721; 722 are arranged so as to be situated on top of one another in the inward-moving direction E. The at least two regions 721; 722 in particular have an identical surface area.

The at least one pile formation device 701 is in particular arranged so as to be transferrable from an inward-moving position 723 into a temporary storage position 724. The at least one pile formation device 701 is in particular arranged so as to be, preferably horizontally, displaced in an inward-moving direction E.

In the temporary storage position 724, the at least one region 721 that is stationary relative to the transport means 703, and the further region 722 that is stationary relative to the pile formation means 705, are arranged on the pile formation means 705 so as to be situated on top of one another in the inward-moving direction E. In particular, the at least one pile formation device 701 is preferably arranged so as to displace with respect to the at least one pile formation means 705, preferably without a relative displacement of the at least one transport means 703.

For example, in an inward-moving position 723, the at least one pile formation device 701 is arranged in a vertical direction V beneath the at least one lower multiple-up separating tool 503. The at least one lower multiple-up separating tool 503 comprises all the means delimiting the spatial areas 506, at least in the horizontal direction. This includes in particular side walls, in particular gates and/or continuous walls, and/or intermediate walls. "Arranged beneath the at least one lower multiple-up separating tool 503" denotes in particular an arrangement of the at least one pile formation device 701 in the vertical direction V beneath a plane E503 that is assigned to the at least one lower multiple-up separating tool. The plane E503 is in particular a preferably horizontally configured plane. A horizontally configured plane denotes in particular a plane that is at least substantially parallel to the plane spanned by the transport direction T and the transverse direction A. The at least one plane E503 is preferably a plane extending through the lower edge of the at least one lower multiple-up separating tool 503. More preferably, the plane E503 is arranged so as to extend through the surface of the underside of the at least one multiple-up separating tool 503. In particular, multiple recesses 506 for depositing individual piles 602 of multiple-ups 03 are arranged on the underside, i.e., the lowest side in the vertical direction V. The plane E503 is, for example, arranged so as not to be influenced by the recesses 506. This in particular denotes an arrangement beneath all the means that influence the stability and/or the spatial area of the piles and/or of the individual piles 602 in the lower multiple-up separating tool 503. The plane E503 is in particular also situated beneath lateral support means and/or side walls. The at least one pile formation device 701 is in particular arranged beneath the plane E503, so that the same can be displaced and/or is arranged so as to be displaceable regardless of and/or without limitation by the at least one lower multiple-up separating tool 503 and/or associated elements.

Furthermore, the at least one pile formation device 701 is arranged in a vertical direction V above the at least one stacking element 604, in particular the at least one delivery element 604. "Above the at least one stacking element 604" in particular indicates an arrangement in the vertical direction V above a plane E604 that is assigned to the at least one stacking element 604, in particular above the at least one delivery element 604. In particular, the plane E604 is in particular a horizontally arranged plane E604. A horizontally configured plane denotes in particular a plane that is at least substantially parallel to the plane spanned by the transport direction T and the transverse direction A. The plane E604 is preferably a plane through an upper edge of the at least one stacking element 604, in particular the at least one delivery element 604. More preferably, the plane E604 is arranged so as to extend through the surface of the upper side of the at least one stacking element 604, in particular of the at least one stacking element 604. In particular, the upper side is the side of the at least one stacking element 604, in particular the side arranged the highest in the vertical direction V. Preferably, multiple recesses are provided on the upper side of the at least one stacking element 604. The plane E604 is, for example, arranged so as not to be influenced by the recesses. In the presence of multiple-ups 03 on the at least one delivery element 604, the plane E604 is preferably arranged to extend through the upper edge in the vertical direction V of the multiple-ups 03 and/or individual piles 602 of multiple-ups.

The at least one pile formation means 705 and the at least one, in particular the at least partially linearly configured, transport means 703 are preferably arranged at least partially parallel to the plane E503 of the at least one lower multiple-up separating tool 503 and parallel to a plane E604 of the at least one stacking element 604, in particular of the at least one delivery element 604. In the temporary storage position 724, the at least one pile formation device 701 is preferably arranged in the vertical direction V between a plane E503 of the at least one multiple-up separating tool 503 and the plane E604 of the at least one delivery element 604.

The at least one pile formation device 701 is preferably arranged so as to be transferrable from a temporary storage position 724 into an outward-moving position 726. The at least one pile formation device 701 is in particular arranged in a manner that is displaced counter to the inward-moving direction E. The at least one pile formation device 701 is preferably arranged so as to be transferrable by at least one unit 500 into the at least one sheet insert unit 700. In particular, the at least one, in particular at least partially linearly configured, transport means 703 and the at least one pile formation means 705 are arranged displaced relative to one another.

In the outward-moving position 726, the at least one pile formation device 701 is in particular spatially arranged in the sheet insert unit 700. "Spatially" shall in particular not only be understood to mean a parallel arrangement, but also an at least overlapping arrangement of the components in the vertical direction V. In the vertical direction V, the at least one pile formation device 701 is arranged above the intermediate sheet cartridge 702. Furthermore, the at least one pile formation device 701 is arranged in the vertical direction V beneath the at least one, preferably multiple transport elements 717.

In particular, in the outward-moving position 726, the region 721 that is stationary relative to the, in particular to the at least partially linearly configured, transport means 703, and the further region 722 that is stationary relative to the pile formation means 705, are arranged offset from one another in the inward-moving direction E. During the transfer from the temporary storage position 724 into the outward-moving position 726, the at least one region 721 that is stationary relative to the transport means 703 is fixedly arranged relative to the region 722 that is stationary with respect to the pile formation means 705.

Furthermore, the at least one pile formation device 701 is arranged so as to be transferrable from an outward-moving position 726 into an inward-moving position 723. The at least one pile formation device 701 is in particular arranged to be held in position during the transfer from the outward-moving position 726 into the inward-moving position 723. The at least one pile formation device 701 is in particular arranged in the sheet insert unit 700 in the outward-moving position 726 and in the inward-moving position 723. The at least one transport means 703 and the at least one pile formation means 705 are in particular arranged from an offset position in a position situated on top of one another in an inward-moving direction E.

Several steps take place for displacing the at least one pile formation device 701 between the positions. In particular, the method for forming piles comprises the steps of inwardly moving the at least one pile formation device 701 in an inward-moving direction E from an inward-moving position 723 into a temporary storage position 724, outwardly moving from a temporary storage position 724 into an outward-moving position 726 counter to the inward-moving direction E, and returning the at least one deposit element 703, in particular the at least one transport means 703, from an outward-moving position 726 into an inward-moving position 723.

In particular, the at least one transport means 703 and the at least one pile formation means 705 are arranged so as to be displaced with respect to a sheet 02 situated on the at least one pile formation device 701, without a relative movement.

During an inward-moving step, the at least one pile formation device 701 is displaced in the inward-moving direction E from the inward-moving position 723 into the temporary storage position 724. In particular, the at least one pile formation device 701 is displaced from the at least one sheet insert unit 700 into the at least one further unit 500, in particular into the at least one multiple-up separating unit 500. In particular, the region 721 that is stationary relative to the transport means 703 and the further region 722 that is stationary relative to the pile formation means 705 are displaced so as to be on top of one another, preferably uniformly, in the inward-moving direction E. During the inward-moving step, in particular no relative movement takes place between the at least one, in particular the at least partially linearly configured, transport means 703 and the at least one pile formation means 705. During the inward-moving step, a sheet 02, in particular a sheet 02 for an intermediate sheet insertion, is preferably arranged lying flat on the at least one pile formation device 701.

During the outward-moving step, the at least one pile formation device 701 is displaced counter to the inward-moving direction E from the temporary storage position 724 into the outward-moving position 726. During the outward-moving step, in particular a relative movement takes place between the at least one deposit element 703, in particular the at least partially linearly configured transport means 703, and the at least one pile formation means 705. In particular, the at least one pile formation device 701 is transferred from the at least one unit 500, in particular the at least one multiple-up separating unit 500, into the at least one sheet insert unit 700. In particular, a relative movement takes place between a region 721 that is stationary relative to the at least partially linearly configured transport means 703 and the further region 722 that is stationary relative to the pile formation means 705. In particular, the at least one pile formation means 705 is displaced counter to the inward-moving direction E by the at least one drive 706. In particular, the at least one pile formation means 705 is displaced in the inward-moving direction E via the at least one connecting element 711, the at least one guide element 712, and the at least one linear guide 708. The region 722 on the at least one pile formation means 705, which is stationary relative to the at least one pile formation means 705, is displaced in the inward-moving direction E during the outward-moving step. Furthermore, the region 722 that is stationary relative to the at least one pile formation means 705 is displaced relative to the region 721 that is stationary with respect to the, in particular at least partially linearly configured, transport means 703. The at least one, in particular at least partially linearly configured, transport means 703 is fixed during the outward-moving step and, in particular, is held in the position. The, in particular at least partially linearly configured, transport means 703 is preferably held in position via the at least one further connecting element 711 and the at least one further guide element 712, and the at least one linear guide 709 and the at least one further drive 704 and/or the at least one drive 704. During the outward-moving step, in particular the region 721 that is stationary relative to the, in particular at least partially linearly configured, transport means 703 is held in position with respect to the inward-moving direction E.

In the outward-moving position 726, the at least one region 721 that is stationary relative to the, in particular at least partially linearly configured, transport means 703, and the region 722 that is stationary relative to the pile formation means 705, are arranged offset in the inward-moving direction E. During a returning step, the at least one pile formation means 705 and the at least one partially linear transport means 703 are displaced relative to one another. During a returning step, the at least one region 721 that is stationary relative to the at least one, in particular at least partially linearly configured, transport means 703 is displaced relative to the region 722 that is stationary relative to the at least one pile formation means 705, on the at least one pile formation means 705. The displacement is in particular such that the two regions 721; 722 are again arranged on top of one another, preferably aligned with one another in the vertical direction V. In particular, the at least one, in particular at least partially linearly configured, transport means 703 is displaced by means of the at least one drive 704 and/or the at least one further drive 704. At least during the inward-moving step, and at least during the returning step, preferably a displacement of the at least one at least partially linearly configured transport means 703 takes place by at least one drive 704 and/or the at least one further drive 704. The at least one pile formation means 705 remains in position. In particular, the position of the at least one pile formation device 701 in the inward-moving direction E is not changed. At least during the inward-moving step and during the outward-moving step, in particular a movement of the at least one pile formation means 701 takes place by the at least one drive 706.

The at least one pile formation device 701 is in particular arranged so as to be displaceable, at least in a vertical direction V, relative to the at least one lower multiple-up separating tool 503 by means of a lifting device 720. In particular, in the temporary storage position 724, the at least one pile formation device 701 is preferably arranged beneath the at least one multiple-up separating mechanism 501, and more preferably beneath the at least one lower multiple-up separating tool 503. In particular, the at least one pile formation device 701 is preferably arranged in contact or at a distance beneath the lower multiple-up separating tool 503. In particular, in the temporary storage position 724, a smallest distance between a plane E701 of the at least one pile formation device 701 and the lower multiple-up separating tool 503, in particular the plane E503, is smaller than 20 cm (twenty centimeters), preferably smaller than 10 cm (ten centimeters). The plane E701 is preferably a plane E701, which is preferably horizontally arranged. In particular, the plane E701 is arranged through the uppermost surface in the vertical direction V, for example a compensating surface of the uppermost surface, of the at least one pile formation device 701, for example through the bearing surface 719. The at least one pile formation device 701 is arranged so as to downwardly delimit the spatial area 506 of the at least one lower multiple-up separating tool 503 in the vertical direction V and/or downwardly delimits the spatial area 506. In particular, the at least one pile formation device 701 is arranged so as to help predefine the spatial area, and in particular is arranged spaced apart from all elements and/or means of the lower multiple-up separating tool 503.

The at least one pile formation device 701 is arranged so as to be displaceable from a temporary storage position 724 into a further temporary storage position. In the further temporary storage position, the at least one pile formation device 701 preferably has a higher temporary storage capacity. In the further temporary storage position, the at least one pile formation device 701 is arranged in a downwardly displaced manner in the vertical direction V. In the further temporary storage position, a spatial area 506 of the at least one lower multiple-up separating tool 503 is in particular arranged so as to be increased with an increased temporary storage capacity. In the temporary storage position 724, the plane E701 of the at least one pile formation device 701 in particular has a first distance with respect to the plane E503. In the further temporary storage position, the plane E701 of the at least one pile formation device 701 is arranged so as to be spaced a larger distance apart from the plane E503 of the at least one lower multiple-up separating tool 503.

A maximum temporary storage capacity for temporarily storing the multiple-ups 03 and/or the individual piles 602 of multiple-ups 03 is in particular increased. In the embodiment in the further temporary storage position having an increased temporary storage capacity, the at least one pile formation device 701 is in particular arranged to be displaceable directly from the further temporary storage position into the outward-moving position 726. In a preferred embodiment, the at least one intermediate sheet cartridge 702 and the at least one transport element 717 are arranged so as to be displaceable and/or displaced in the vertical direction by the at least one lifting device 720, preferably to the same extent as the at least one pile formation device 701.

The at least one stacking element 604, in particular the at least one delivery element 604, is arranged so as to be displaceable in a vertical direction V by a further lifting device 603. In a vertical direction V, the at least one pile formation device 701 is arranged above the at least one stacking element 604 and/or above the at least one delivery pile 601. In a preferred embodiment, the at least one stacking element 604 and/or the at least one delivery element 604 and/or the at least one delivery pile 601, prior to an outward-moving step, are arranged at a distance with respect to the at least one pile formation device 701. The smallest distance with respect to at least one delivery pile 601 or the smallest distance with respect to at least one stacking element 604 is preferably smaller than 20 cm (twenty centimeters), more preferably smaller than 10 cm (ten centimeters), and still more preferably smaller than 4 cm (four centimeters).

In the embodiment in which the at least one pile formation device 701 is arranged in the further temporary storage position, the at least one stacking element 604 and/or the at least one delivery element 604 and/or the at least one delivery pile 601, prior to an outward-moving step, are arranged at a distance with respect to the at least one pile formation device 701. In particular, the smallest distance between the at least one pile formation device 701, in the further temporary storage position, and at least one delivery pile 601, or a smallest distance with respect to at least one stacking element 604, and in particular with respect to the plane E604, is smaller than 20 cm (twenty centimeters), more preferably smaller than 10 cm (ten centimeters), and still more preferably smaller than 4 cm (four centimeters).

In particular, at least one sensor is, preferably multiple sensors are, arranged so as to be assigned to the at least one stacking element 604, in particular the at least one delivery element 604. The at least one stacking element 604 is in particular functionally connected to the at least one sensor in terms of open-loop control and/or closed-loop control. In particular, the at least one functionally connected sensor is arranged in such a way that the distance between the at least one stacking element 604 and/or the delivery pile 601 and the at least one pile formation device 701 can be controlled by open-loop control and/or closed-loop control. In particular, the at least one stacking element 604 is arranged so as to be displaceable in the vertical direction V as a function of the position of the at least one pile formation device 701. A height of a pile 601 of the at least one stacking element 604 can in particular be detected by at least one sensor.

In one embodiment, the at least one pile formation device 701 comprises at least one further sensor, preferably multiple further sensors, that have a functional connection. In particular, the position of the at least one pile formation device 701 in the vertical direction V can be detected by the at least one further sensor. In particular, the at least one further sensor is arranged in such a way that a fill level of the at least one spatial area 506 of the at least one lower multiple-up separating tool 503 can be detected and/or picked up. The at least one pile formation device 701 is in particular arranged so as to be displaceable in the vertical direction V as a function of a fill level of the spatial area 506. In particular proceeding from the fill level of the spatial area 506 of the at least one lower multiple-up separating tool 503, the at least one pile formation device 701 is displaced in the vertical direction V.

In another embodiment, a distance between the lower multiple-up separating tool 503 and the at least one pile formation device 701 is increased prior to an outward-moving step.

In a method for forming piles, a plane E701 of at least one pile formation device 701, at least in the temporary storage position 724, is arranged in the vertical direction V beneath a plane E503 of at least one lower multiple-up separating tool 503. A distance between the plane E701 and the plane E503 is in particular increased by a displacement, in the vertical direction V, of the at least one pile formation device 701 relative to the lower multiple-up separating tool 503. The at least one pile formation device 701 is in particular displaced in a vertical direction V in order to increase the temporary storage capacity. The at least one pile formation device 701 is in particular transferred from the temporary storage position 724 into a further temporary storage position having an increased temporary storage capacity. The at least one pile formation device 701 is displaced downwardly in the vertical direction V, in particular counter to the vertical direction V, so that the at least one pile formation device 701 is spaced apart from the at least one lower multiple-up separating tool 503. In particular, a distance with respect to the at least one lower multiple-up separating tool 503 and/or the at least one multiple-up separating mechanism 501 is increased. In particular, the spatial area 506 of the at least one lower multiple-up separating tool 503 is increased by the displacement of the at least one pile formation device 701 counter to the vertical direction V.

In particular, the at least one stacking element 604 and/or the at least one delivery pile 601 are adapted in the vertical direction V to the at least one pile formation device 701. The at least one stacking element 604 and/or the at least one delivery pile 601 are in particular adapted in such a way that a distance of the at least one stacking element 604 and the at least one delivery pile 601 with respect to the at least one pile formation device 701 remains the same. In particular, a distance, at least prior to an outward-moving step, between the at least one pile formation device 701 and the at least one stacking element 604 and/or the at least one delivery pile 601 and/or preferably the plane E604 is small, in particular smaller than 20 cm (twenty centimeters), more preferably smaller than 10 cm (ten centimeters), and still more preferably smaller than 4 cm (four centimeters).

In particular, the distance between the at least one pile formation device 701 and the at least one stacking element 604 and/or the at least one delivery pile 601 is detected by means of the at least one sensor and adapted by means of the at least one lifting device 603 using a signal. In particular at least when a maximum fill level of the at least one spatial area 506 of the at least one lower multiple-up separating tool 503 is reached, the at least one pile formation device 701 is displaced counter to the vertical direction V.

Hereafter, the method and the sheet processing machine 01 are described during operation using at least one sheet 02. In particular, the individual positions and steps in this regard are described.

In the inward-moving position 723 and/or during the inward-moving step, preferably at least one, preferably unprocessed, sheet 02 is situated on the at least one pile formation device 701. The at least one sheet 02 is preferably removed from the at least one intermediate sheet cartridge 702 and lifted and deposited by means of the at least one transport element 717 onto the at least one pile formation device 701.

The at least one pile formation device 701 is in particular displaced into the temporary storage position 724 using the inward-moving step. In the temporary storage position 724, several multiple-ups 03, in particular several individual piles 602 of multiple-ups 03, are stacked, in particular temporarily stacked, on the preferably one sheet 02 on the at least one pile formation device 701. In particular, the multiple-ups 03 are separated by the multiple-up separating mechanism 501 from at least one offcut piece 05; 06 and temporarily stored and/or stacked in the temporary storage position 724 on at least one temporary storage pile 716 on the at least one pile formation device 701. The multiple-ups 03 and the sheet 02 are in particular temporarily stored in the at least one spatial area 506 of the at least one lower multiple-up separating tool 503. In particular, a maximum temporary storage capacity of the multiple-ups 03 and/or of the individual piles 602 is predefined by way of the spatial area 506 of the at least one lower multiple-up separating tool 503.

For example, when a maximum fill level of the at least one spatial area 506 of the at least one lower multiple-up separating tool 503 is reached, the at least one pile formation device 701 is displaced in the vertical direction V. The at least one pile formation device 701 is in particular displaced, as needed, in the vertical direction V by means of the at least one lifting device 720 by way of the sensor detecting at least the fill level of the spatial area 506. In particular, a distance between the at least one pile formation device 701 and the at least one lower multiple-up separating tool 503 is increased so that several multiple-ups 03 and/or individual piles 602 of multiple-ups 03 fit in the spatial area 506. When sheets 02 and/or several individual piles 604 of multiple-ups 03 are situated as a delivery pile 601 on the at least one stacking element 604, in particular the at least one delivery element 604, the smallest distance between the delivery pile 604 and the at least one pile formation device 701 is adapted to one another. Otherwise, the distance between the at least one stacking element 604 and the at least one pile formation device 701 is adapted. This distance is in particular adapted prior to the outward-moving step in such a way that the distance is small, in particular smaller than 20 cm (twenty centimeters), more preferably smaller than 10 cm (ten centimeters), and still more preferably smaller than 4 cm (four centimeters). During the outward-moving step, the temporarily stored sheets 02 and/or individual piles 602 of multiple-ups 03 are in particular deposited onto the at least one delivery pile 601 and/or the at least one stacking element 604.

So as to increase the temporary storage capacity during the temporary storage step, a distance between the plane E703 of the at least one conveyor belt 703 and the plane E503 of the at least one lower multiple-up separating tool 503 is increased. For this purpose, the at least one pile formation device 701 is in particular shifted in the vertical direction V.

Prior to an outward-moving step, a sheet 02 is at least partially lifted off the at least one supply pile 718 of the at least one intermediate sheet cartridge 702 in the vertical direction V by the at least one suction transport means 717. The lifting is in particular at least carried out to such an extent that the at least one sheet 02 is at least partially situated above the at least one pile formation device 701. The sheet 02 is in particular lifted by the at least one transport element 717 onto a plane in the vertical direction V above the plane E703 of the at least one transport means 703.

During an outward-moving step, the temporary storage pile 716 is deposited from the at least one pile formation device 701 onto the at least one stacking element 604, in particular the at least one delivery element 604. During the outward-moving step, in particular almost no or no relative movement takes place between the at least one temporary storage pile 716 and the at least one, in particular at least partially linearly configured, transport means 703.

In the preferred embodiment comprising a returning step, the at least one sheet 02 is held by the at least one suction transport means 717 at least until a returning step has been completed. In particular, the at least one sheet 02 is then deposited onto the at least one pile formation device 701 after the returning step, in particular in or just prior to the inward-moving position 723.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet processing machine (01) comprising at least one pile formation device (701) and comprising at least one lower multiple-up separating tool (503), the at least one pile formation device (701) being arranged so as to be displaceable at least in an inward-moving direction (E), the at least one pile formation device (701) including a plane (E701), the at least one pile formation device (701) being arranged so as to be displaceable at least in a vertical direction (V) relative to the at least one lower multiple-up separating tool (503) by means of a lifting device (720), and, in a temporary storage position (724), at least the plane (E701) being arranged in a vertical direction (V) beneath a plane (E503) of the lower multiple-up separating tool (503), characterized in that the plane (E503) of the lower multiple-up separating tool (503) is arranged beneath all the means that delimit recesses and/or a spatial area (506) of the individual piles (602) and/or the piles in the lower multiple-up separating tool (503), and that, in the temporary storage position (724), the plane (E701) of the at least one pile formation device (701) has a first distance with respect to the plane (E503) of the lower multiple-up separating tool (503), and that, in a further temporary storage position, the plane (E701) of the at least one pile formation device (701) is arranged at an increased distance with respect to the plane (E503) of the lower multiple-up separating tool (503).

2. The sheet processing machine according to claim 1, characterized in that the at least one pile formation device (701) is arranged so as to be displaceable in the vertical direction (V) from the temporary storage position (724) into the further temporary storage position in order to increase the temporary storage capacity.

3. The sheet processing machine according to claim 1, characterized in that the at least one pile formation device (701) is arranged so as to downwardly delimit a spatial area (506) of the at least one lower multiple-up separating tool (503) in the vertical direction (V), and that the at least one pile formation device (701) comprises a sensor and/or a further sensor for detecting the fill level of the spatial area (506) of the lower multiple-up separating tool (703).

4. The sheet processing machine according to claim 3, characterized in that the at least one pile formation device (701) is arranged so as to be displaceable in the vertical direction (V) as a function of a fill level of the spatial area (506).

5. The sheet processing machine according to claim 1, characterized in that the position of the at least one pile formation device (701) in the vertical direction (V) is detectable by at least one sensor.

6. The sheet processing machine according to claim 5, characterized in that a height of a pile (601) of the at least one stacking element (604) is detectable by at least one further sensor, and that the at least one stacking element (604) is arranged so as to be displaceable in a vertical direction (V) to the position of the at least one pile formation device (701).

7. The sheet processing machine according to claim 1, characterized in that the at least one pile formation device (701) is arranged in a vertical direction (V) above at least one stacking element (604) and/or at least one delivery pile (601), and that the at least one stacking element (604) is arranged so as to be displaceable in the vertical direction (V) by a further lifting device (603), and that the at least one stacking element (604) is arranged so as to be displaceable in the vertical direction (V) as a function of the position of the at least one pile formation device (701).

8. The sheet processing machine according to claim 1, characterized in that the at least one pile formation device (701) comprises a deposit element (703) that can be displaced relative to at least one pile formation means (705).

9. The sheet processing machine according to claim 8, characterized in that the at least one deposit element (703) is configured as at least one at least partially linearly configured transport means (703), and that the at least one pile formation device (701) is arranged so as to be at least horizontally displaceable by means of a drive (706), and that the at least one at least partially linearly configured transport means (703) is arranged to be displaceable in relative terms by means of a further drive (704).

10. The sheet processing machine 8, characterized in that the at least one deposit element (703) and the at least one pile formation means (705) are driven by means of a coaxial shaft (731).

11. A method for forming piles in a sheet processing machine (01) comprising at least one pile formation device (701) and comprising at least one lower multiple-up separating tool (503), comprising the steps of inwardly moving the at least one pile formation device (701) in an inwardly-moving direction (E) from an inward-moving position (723) into a temporary storage position (724), outwardly moving the at least one pile formation device (701) from a temporary storage position (724) into an outwardly-moving position (726) counter to the inwardly-moving direction (E), the at least one pile formation device (701) including a plane (E701) and, at least in the temporary storage position (724), being arranged in the vertical direction (V) beneath a plane (E503) of a lower multiple-up separating tool (503), characterized in that the plane (E503) of the lower multiple-up separating tool (503) is arranged beneath all the means that delimit recesses and/or a spatial area (506) of the individual piles (602) and/or the piles in the lower multiple-up separating tool (503), that, so as to increase the distance between the plane (E701) of the at least one pile formation device (701) and the plane (E503) of the lower multiple-up separating tool (503), the at least one pile formation device (701) is displaced relative to the at least one lower multiple-up separating tool (503) counter to a vertical direction (V) by means of a lifting device (720), and that, so as to increase the temporary storage capacity, the at least one pile formation device (701) is displaced counter to the vertical direction (V) from the temporary storage position (724) at a first distance between the plane (E503) of the at least one lower multiple-up separating tool (503) and the plane (E701) of the at least one pile formation device (701) into a further temporary storage position at an increased distance between the plane (E503) of the at least one lower multiple-up separating tool (503) and the plane (E701) of the at least one pile formation device (701).

12. The method according to claim 11, characterized in that the at least one pile formation device (701) downwardly delimits the spatial area (506) of the at least one lower multiple-up separating tool (503) in the vertical direction (V).

13. The method according to claim 12, characterized in that at least one further sensor is able to detect and/or detects the fill level of the spatial area (506) of the lower multiple-up separating tool (503).

14. The method according to claim 11, characterized in that at least one stacking element (604) and/or the at least one delivery pile (601) are adapted to the at least one pile formation device (701) in the vertical direction (V) by means of a further lifting device (603), and that the distance between the at least one pile formation device (701) and the at least one stacking element (604) and/or the at least one delivery pile (601) is detected by means of at least one sensor, and that a distance between the delivery pile (601) and/or the at least one stacking element (604) and the at least one pile formation device (701) are adapted to one another.

15. The method according to claim 11, characterized in that the at least one pile formation device (701) comprises at least one horizontally displaceable pile formation means (705) and at least one deposit element (703) that can be displaced relative to the at least one horizontally displaceable pile formation means (705).

* * * * *